United States Patent [19]
Cook-Hellberg et al.

[11] Patent Number: 5,530,931
[45] Date of Patent: Jun. 25, 1996

[54] METHOD AND APPARATUS FOR PROVIDING A LOOK AHEAD FEATURE FOR ENHANCED CALL FORWARDING IN A TELECOMMUNICATIONS SYSTEM

[75] Inventors: Karen A. Cook-Hellberg, Plano; M. Amelia Noriega, Frisco; Kathleen A. Angerer; Lorie A. Presto-Railey, both of Garland; Prafulla M. Shintri, Dallas; Susanna Adam, Fort Worth; Suzy M. Vasa, Garland; Vladimir Alperovich, Dallas, all of Tex.

[73] Assignee: Telefonaktiebolaget L M Ericsson, Stockholm, Sweden

[21] Appl. No.: 326,271

[22] Filed: Oct. 20, 1994

[51] Int. Cl.⁶ .................................................. H04M 3/58
[52] U.S. Cl. .................... 379/211; 379/210; 379/221; 379/256; 379/252
[58] Field of Search ................... 379/201, 211, 379/212, 67, 88, 89, 112, 209, 210, 229, 221, 220, 219, 256, 252

[56] References Cited

U.S. PATENT DOCUMENTS

| | | | |
|---|---|---|---|
| 3,854,013 | 12/1974 | Altenburger et al. | 379/211 |
| 4,150,257 | 4/1979 | Fenton et al. | 379/211 |
| 4,436,962 | 3/1984 | Davis et al. | 379/211 |
| 4,436,963 | 3/1984 | Cottrell et al. | 379/211 |
| 4,475,009 | 10/1984 | Rais et al. | 379/211 |
| 4,626,630 | 12/1986 | Waldman | 379/199 |
| 4,670,900 | 6/1987 | Waldman | 379/211 |
| 4,674,115 | 6/1987 | Kaleita et al. | 379/201 |
| 4,723,273 | 2/1988 | Diesel et al. | 379/211 |
| 4,742,539 | 5/1988 | Szlam | 379/377 |
| 4,768,221 | 8/1988 | Green et al. | 379/67 |
| 4,809,321 | 2/1989 | Morganstein et al. | 379/211 |
| 4,873,717 | 10/1989 | Davidson et al. | 379/211 |
| 4,969,185 | 11/1990 | Dorst et al. | 379/209 |
| 5,023,868 | 6/1991 | Davidson et al. | 379/112 |
| 5,195,131 | 3/1993 | Sano | 379/211 |
| 5,206,901 | 4/1993 | Harlow et al. | 379/211 |
| 5,243,645 | 9/1993 | Bissell et al. | 379/211 |
| 5,309,512 | 5/1994 | Blackmon et al. | 379/210 |
| 5,329,578 | 7/1994 | Brennan et al. | 379/88 |
| 5,337,351 | 8/1994 | Manabe et al. | 379/201 |

FOREIGN PATENT DOCUMENTS

| | | |
|---|---|---|
| 0350918A2 | 7/1989 | European Pat. Off. . |
| 0498593A2 | 8/1992 | European Pat. Off. . |
| 0550975A3 | 7/1993 | European Pat. Off. . |
| 0588646A3 | 9/1993 | European Pat. Off. . |
| 2837856A1 | 3/1980 | Germany . |
| 2837883A1 | 3/1980 | Germany . |
| 61-079353 | 4/1986 | Japan . |
| 1194739 | 8/1989 | Japan . |
| 2311064 | 12/1990 | Japan . |
| 3044159 | 2/1991 | Japan .......................... H04M 3/54 |
| 2279209 | 12/1994 | United Kingdom . |
| WO9222164 | 6/1992 | WIPO . |

OTHER PUBLICATIONS

Udaya Shankar and Cliff Lai, AT&T Bell Laboratories, *Interworking Between Access Protocol and Network Protocol For Interswitch ISDN Services*, Nov. 22–24, 1989, pp. 10–14.

Bellcore Technical Reference, TR–TSY–000586, Issue 1, Jul. 1989, pp. 1–18.

*Primary Examiner*—Jeffery Hofsass
*Assistant Examiner*—Scott Wolinsky
*Attorney, Agent, or Firm*—Jenkens & Gilchrist

[57] ABSTRACT

A method and apparatus for providing an enhanced Call Forwarding Don't Answer feature is disclosed. When an originating address calls a base address assigned the Call forwarding Don't Answer feature and the call is forwarded to a remote address, a Look Ahead feature is implemented. The Look Ahead feature determines if a call setup to a remote address is successful, unsuccessful or points out a feature assigned to the remote line. The originating address is provided with ring tone during the call setup. The call setup results are then used to make appropriate connections to implement the functions of the feature while providing a steady ring tone to the originating address.

32 Claims, 22 Drawing Sheets

| Call Setup Result | System Event |
|---|---|
| Successful | Through Connection |
| Unsuccessful | Busy Subscriber |
| Unsuccessful | Congestion |
| Unsuccessful | Other Tone Requested |
| Unsuccessful | Other Fault at Setup |
| Feature pointed out | Feature pointed out |

| Call Setup Result | System Event |
|---|---|
| Successful | Through Connection |
| Unsuccessful | Busy Subscriber |
| Unsuccessful | Congestion |
| Unsuccessful | Other Tone Requested |
| Unsuccessful | Other Fault at Setup |
| Feature pointed out | Feature pointed out |

FIG.9A

| Signal | Source and Destination |
|---|---|
| CFDTimerExpires | TrafficMgr ⟶ FeatureMgr |
| SeizeFeature | FeatureMgr ⟶ FeatureCFD<br>InteractionMgr ⟶ FeatureOther |
| FeatureSeized | FeatureCFD ⟶ FeatureMgr<br>FeatureOther ⟶ InteractionMgr |
| Read FeatData | FeatureCFD ⟶ FeatureDB<br>FeatureOther ⟶ ⬆ |
| FeatData | FeatureDB ⟶ FeatureCFD<br>　　　　　 ⟶ FeatureOther |
| ReleaseFeature | FeatureCFD ⟶ FeatureMgr<br>FeatureOther ⟶ InteractionMgr |
| FeatureReleased | FeatureMgr ⟶ FeatureCFD<br>InteractionMgr ⟶ FeatureOther |
| WriteSetupData | FeatureCFD ⟶ FeatureMgr<br>FeatureOther ⟶ InteractionMgr<br>FeatureMgr ⟶ TrafficMgr<br>InteractionMgr ⟶ FeatureMgr |
| CreatCall | FeatureCFD ⟶ FeatureMgr<br>FeatureOther ⟶ ⬆ |
| SetupNewCall | FeatureMgr ⟶ TrafficMgr |
| Connect | TrafficMgr ⟶ ConnetionMgr |
| Connected | ConnectionMgr ⟶ TrafficMgr |
| ThroughConnect | TrafficMgr ⟶ FeatureMgr |
| CallSetup(Success) | FeatureMgr ⟶ FeatureCFD<br>　　　　　　　FeatureOther |
| Busy/CongestedSub | TrafficMgr ⟶ FeatureMgr |
| CallSetup(failure) | FeatureMgr ⟶ FeatureCFD<br>　　　　　 ⟶ FeatureOther |
| FeaturePointedOut | TrafficMgr ⟶ FeatureMgr |

FIG. 9B

| Signal | Source and Destination |
|---|---|
| Split | FeatureCFD ⟶ FeatureMgr |
| BreakConnection | FeatureMgr ⟶ ConnectionMgr |
| ConnBroken | ConnectionMgr ⟶ FeatureMgr |
| SplitR | FeatureMgr ⟶ FeatureCFD |
| Free | FeatureCFD ⟶ FeatureMgr |
| Freed | FeatureMgr ⟶ FeatureCFD |
| Release | FeatureMgr ⟶ ConnectionMgr |
| Released | ConnectionMgr ⟶ FeatureMgr |
| Join | FeatureCFD ⟶ FeatureMgr |
| Joined | FeatureMgr ⟶ FeatureCFD |
| Handover(feature, concurrent) | FeatureCFD ⟶ FeatureMgr, FeatureOther ⟶ |
| Handover(feature, chained) | FeatureCFD ⟶ FeatureMgr, FeatureOther ⟶ |
| SeizeInteractionLogic | FeatureMgr ⟶ InteractionMgr |
| LogicSeized | InteractionMgr ⟶ FeatureMgr |

FIG.11D

| DESCRIPTION | LABEL | INTERWORK |||||
|---|---|---|---|---|---|---|
| | | TrafficMgr ConnectionMgr | FeatureMgr | FeatureMgr InteractionMgr | FeatureCFD FeatureOther | FeatureDB |
| Setup to a busy/congested subscriber with no terminating feature active. | | Busy/CongestedSub → | | CallSetup(failure) → | | |
| The remote address is busy or congested. | | | | | | |

FIG.11E

| DESCRIPTION | LABEL | INTERWORK |||||
|---|---|---|---|---|---|---|
| | | TrafficMgr ConnectionMgr | FeatureMgr | FeatureMgr InteractionMgr | FeatureCFD FeatureOther | FeatureDB |
| Setup to a subscriber with a terminating feature active. | | FeaturePointedOut → | | CallSetup(feature) → | | |

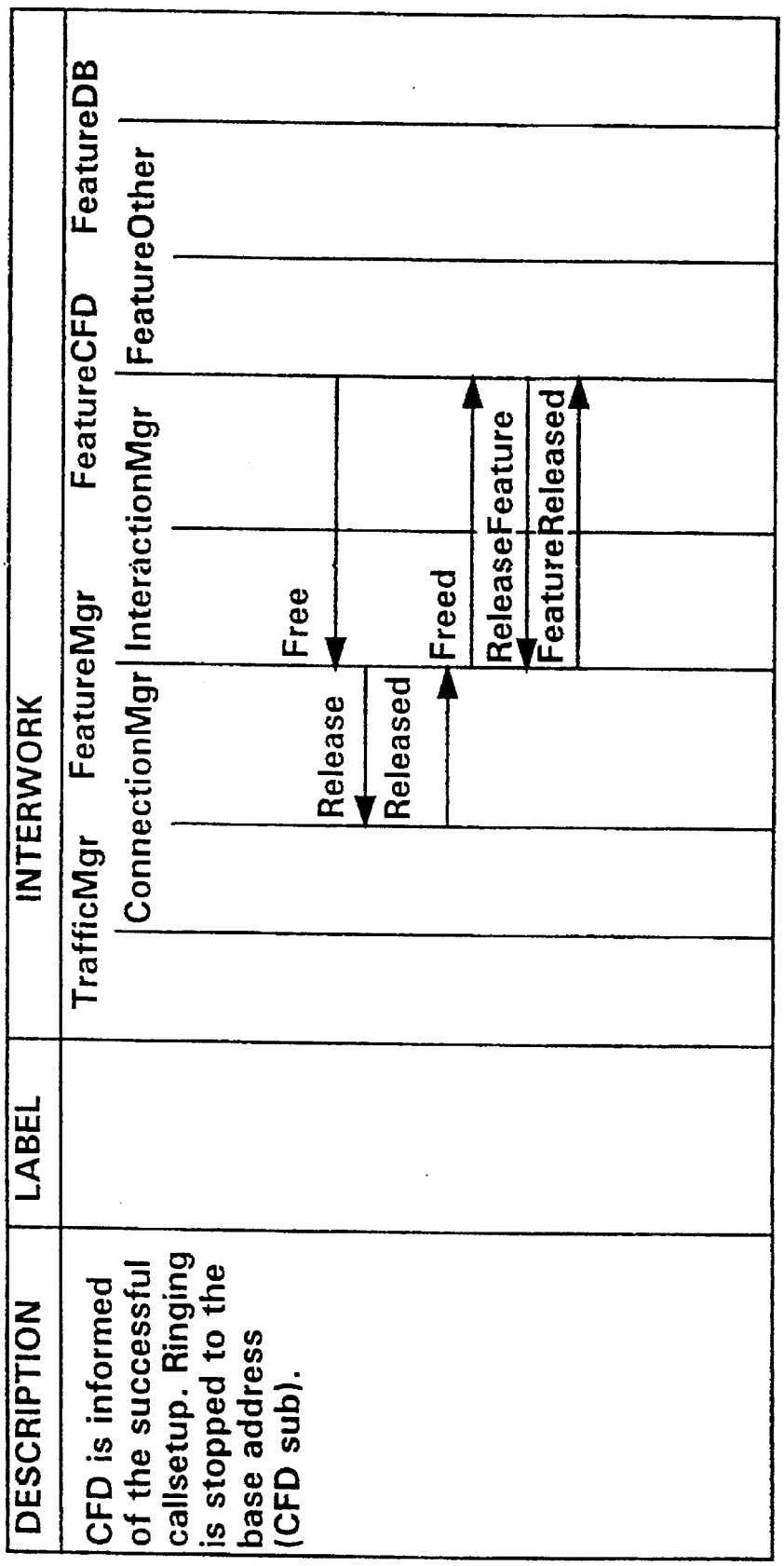

FIG.11H

| DESCRIPTION | LABEL | INTERWORK |
|---|---|---|
| Remote address has a terminating feature active. The other feature is not a call setup type feature so this is considered a successful call setup.<br><br>CFD stops ringing to the base address and hands over control of the call to the other feature.<br><br>The other feature handles the call. | | TrafficMgr / ConnectionMgr — FeatureMgr — FeatureMgr / InteractionMgr — FeatureCFD — FeatureOther / FeatureDB<br><br>Free<br>Release<br>Released<br>Freed<br>Handover(feature, chained)<br>ReleaseFeature<br>FeatureReleased<br>SeizeFeature |

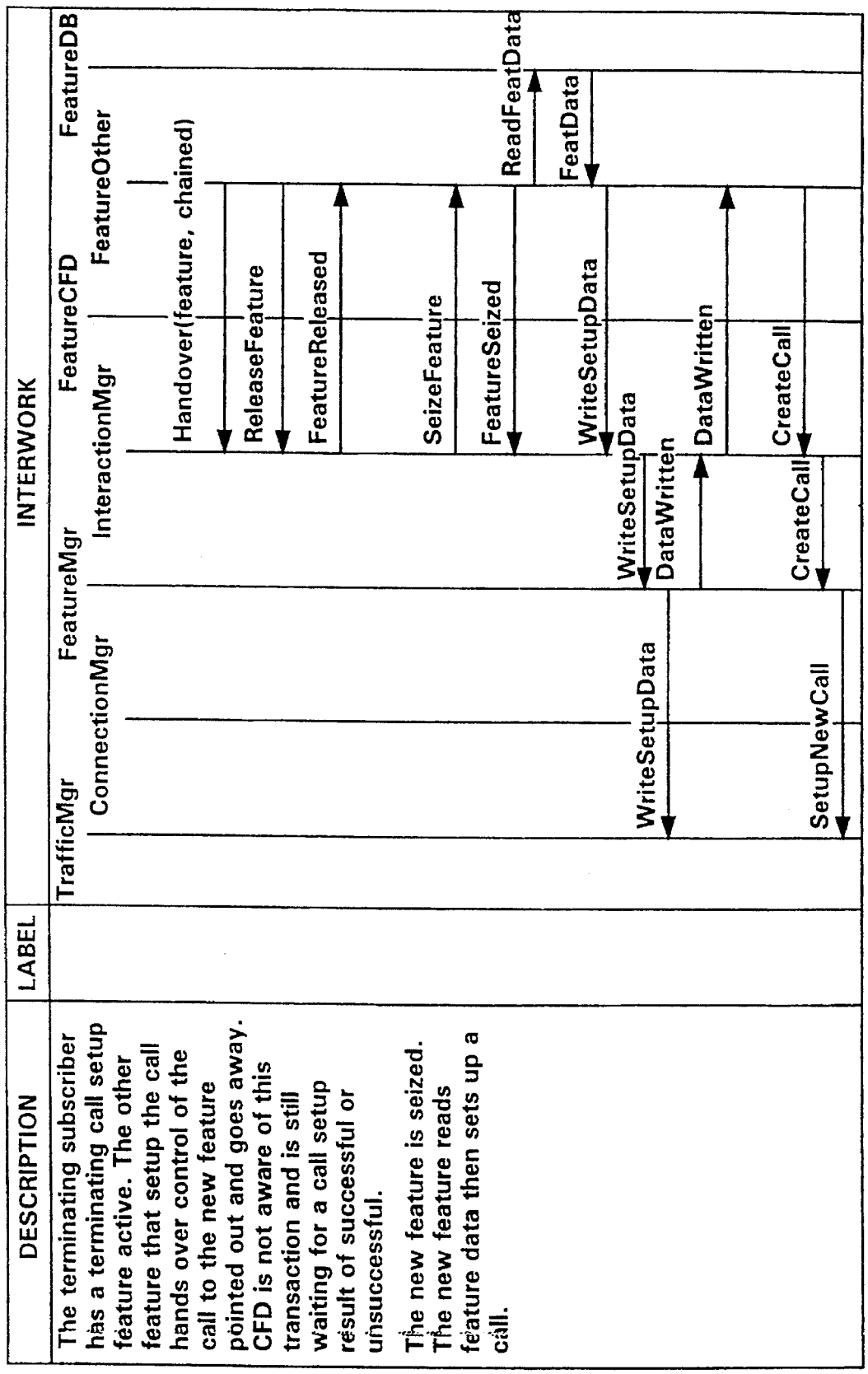

METHOD AND APPARATUS FOR PROVIDING A LOOK AHEAD FEATURE FOR ENHANCED CALL FORWARDING IN A TELECOMMUNICATIONS SYSTEM

BACKGROUND OF THE INVENTION

1. Technical Field of the Invention

This invention relates to call processing in a telecommunications system and, more particularly, to the processing of an enhanced Call Forwarding Don't Answer feature.

2. Description of Related Art

Developments and improvements in communications switching systems have allowed telecommunication system operators to offer a number of new and useful services to system subscribers. One example of this type of service is the call forwarding feature currently provided by telephone companies. Call forwarding allows subscribers to the service to automatically redirect calls made to the subscriber's number (base address) to another number (remote address) in the system.

Present telephone systems provide the call forwarding feature in various forms. Examples include Call Forwarding Variable (CFV), in which the subscriber is allowed to directly activate and deactivate forwarding and to specify the remote address to which calls are to be forwarded during each activation. While CFV is active calls to the subscriber's line are directed to the remote address, and, if the remote address is idle, a reminder ring is provided to the base address. A second example of call forwarding features is Call Forwarding Busy Line (CFBL). In CFBL, calls to the feature base address are forwarded to a remote address only when the base address is busy. A third example of call forwarding is Call Forwarding Don't Answer (CFD). In CFD, calls terminating at the base address ring the base address for a specified interval. A CFD timer is used to time the interval. If the call is not answered, it is routed to a remote address.

Because the base address rings in CFD, present implementations of CFD suffer from a shortcoming which occurs when calls cannot be successfully forwarded. When a call is not successfully forwarded after the called base address hasn't answered, a caller (originating address) will hear a ring tone and then a busy or congestion tone. Hearing the busy or congestion tone after having heard a ring tone is confusing to the caller and is not desirable in a telephone system.

A typical solution involves checking the line state of the forwarding line before the call is forwarded. If the line state is other than idle, the call is not forwarded. This solution is disadvantageous in that the remote address may be busy but may have a feature, like Call Forwarding Variable (CFV), Call Waiting (CW) or Series Completion Busy (SCB), that could enable the call to be completed, but will not be invoked because the call is not forwarded upon finding the line other than idle. Also, a second problem occurs when, even if the line state is idle, a call can not be forwarded successfully due to congestion. In this situation the caller at the originating address will hear the confusing sequence of a ring tone followed by a congestion tone.

The telephone industry standard for Call Forwarding Subfeatures, Bellcore document TR-TSY-000586, Issue 1, July, 1989, is hereby incorporated by reference herein. The standard requires that the problem of unsuccessful forwarding to a second feature or busy remote address be accounted for in systems conforming to that standard. The BellCore standard sets forth the general requirement that if the remote address is busy, but has a forwarding feature that can be invoked, then the forwarding from the remote address should be performed. The standard also requires that if the remote address is busy, and has no forwarding features, then the call should be considered a non-forwarded call, and non-forwarding call treatment is applied to the call. The non-forwarding call treatment in the standard is to continue ringing at the base address and continue sending a ring tone to the originating address. If the standard requirement is met, an originating subscriber will not hear a ring tone followed by a busy tone if the remote address is busy. Also, a second forwarding will be performed if the CFD is to a remote address which is assigned a forwarding feature.

The Bellcore standard does not address the problems which can occur in CFD when sequential forwardings are involved. For example, an originating address may call a base address, which in turn has CFD implemented to forward to a first remote address which has CFV implemented to forward to a second remote address. In this situation if the base address does not answer, and the second remote address is busy, the caller at the originating address will hear a ring tone when the base address rings and then hear a busy tone after the call is forwarded from the first remote address to the second remote address. In addition, a second problem occurs in this solution when a call can not be forwarded from the base address successfully due to congestion, even though the remote address is idle, or is busy and has a feature that can be invoked. In this situation, even though the remote address is idle or is busy and has a feature that can be invoked, the caller at the originating address will hear the confusing sequence of a ring tone followed by a congestion tone.

SUMMARY OF THE INVENTION

The present invention provides a method and apparatus which provides Call Forwarding Don't Answer with a Look Ahead feature. The Look Ahead feature prevents the sequence of a ring tone followed by a busy or congestion tone from being heard at the originating address when a call can not be successfully forwarded.

In one aspect, the present invention provides a method and apparatus in a communications system for receiving a call directed from a first subcriber station to a second subscriber station, creating a through connection between the first and second subscriber stations, alerting the second station, providing a ring tone to the first station, breaking the connection between the first and second stations, performing a call setup to a third subscriber station, and, determining the results of the Call Setup.

In another aspect, the present invention provides a method and apparatus for continuing the alerting of the third station and terminating the alerting of the second station if the Call Setup result is successful.

In another aspect, the present invention provides a method and apparatus for reconnecting the second station to the first station if the Call Setup result is unsuccessful.

In still another aspect, the present invention provides a method and apparatus for invoking a feature if the Call Setup result was a feature pointed out, performing a second Call Setup to a fourth subscriber station and determining the results of the second Call Setup.

BRIEF DESCRIPTION OF THE DRAWINGS

For a more detailed understanding of the present invention, for further objects and advantages thereof, reference can now be had to the following description, taken in conjunction with the accompanying drawings in which:

FIG. 9A is a table which illustrates signals interchanged between the functional blocks of FIG. 2 when actions are taken by Call Forwarding Don't Answer Look Ahead Software in the present embodiment of the invention;

FIG. 9B is a table which illustrates signals interchanged between the functional blocks of FIG. 2 when actions are taken by Call Forwarding Don't Answer Look Ahead Software in the present embodiment of the invention;

DETAILED DESCRIPTION OF THE INVENTION

Figure 1:
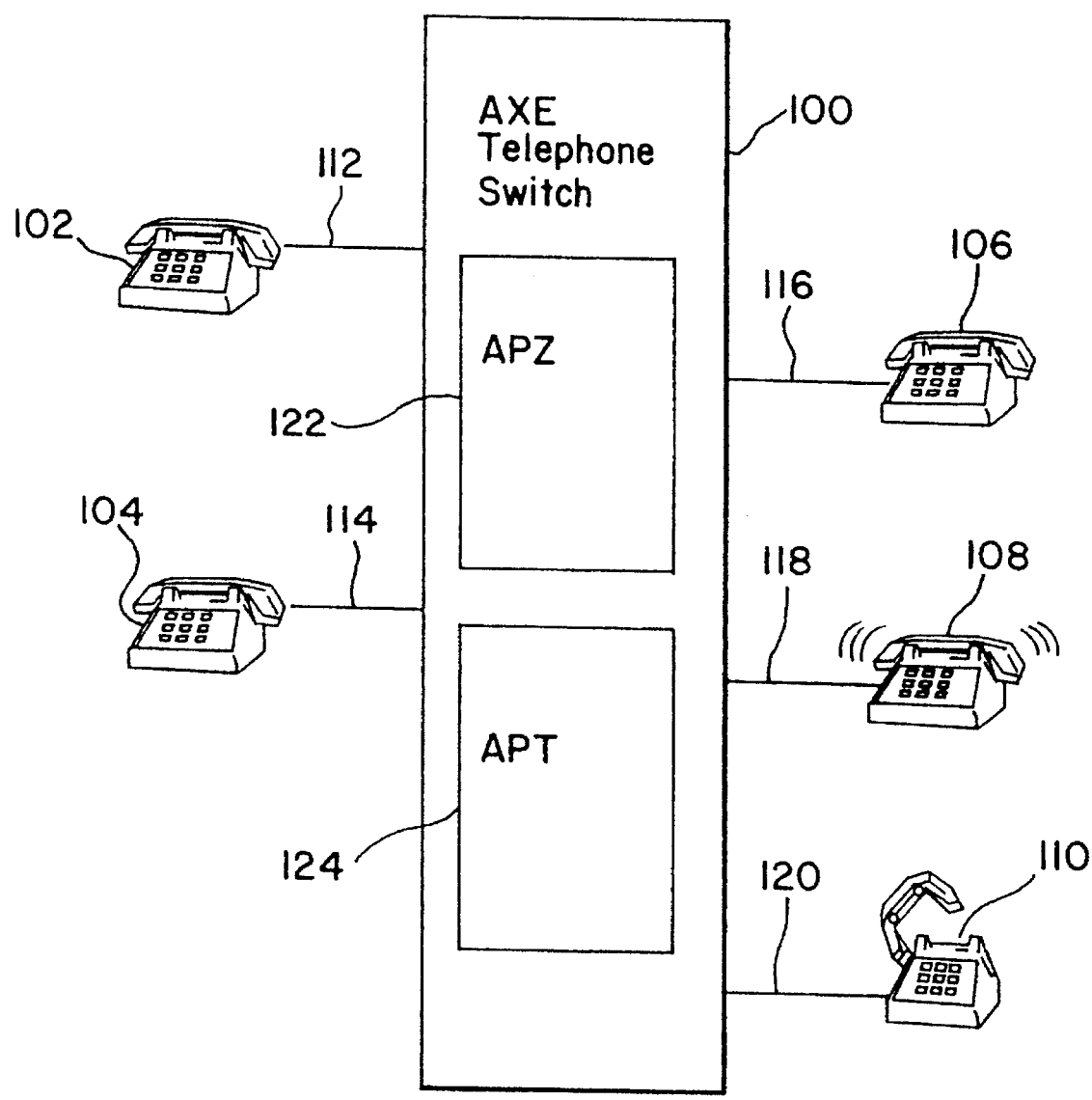
FIG. 1 is a high level block diagram of a telephone system switching arrangement suitable for implementing the preferred embodiment of the present invention.

FIG. 1 shows a telephone switching system in which the present invention may be implemented. The system of FIG. 1 includes a stored program controlled telecommunications switch 100 which may be, for example, an AXE from Ericsson. The system also includes station subscriber sets 102, 104, 106, 108 and 110, and basic subscriber access lines 112, 114, 116, 118 and 120. The AXE 100 contains a hardware and operating system software subsystem referred to as an APZ subsystem 122 and a software subsystem referred to as an APT subsystem 124. The access lines 112–120 may be, for example, basic rate lines type Q.931. The APZ 122 contains the hardware and processors for operating applications software which is contained within the APT 124. The APT 124 also contains switching equipment for directing call traffic, as well as feature software which implements call service features.

Figures 2, 3:
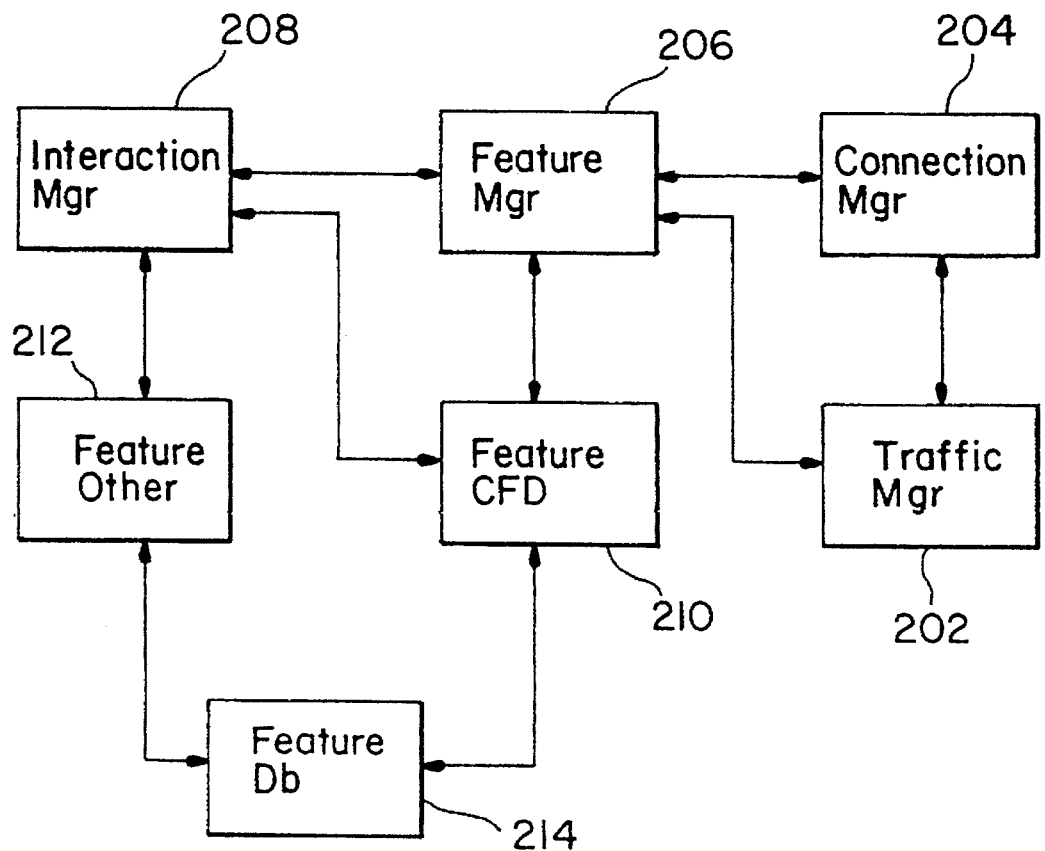
FIG. 2 is a illustrative functional block diagram of Call Forwarding Don't Answer Look Ahead software and hardware organization in the AXE of FIG. 1.
FIG. 3 is a table categorizing Call Setup System events which occur during implementation of the Call Forwarding Don't Answer Look Ahead feature.

FIG. 2 is a illustrative functional block diagram of Call Forwarding Don't Answer Look Ahead software and hardware and related hardware and software functions in the APT Section of the AXE of FIG. 1. The functional blocks of the APT software and hardware include the Traffic Manager(TrafficMgr) 202, Connection Manager (ConnectionMgr) 204, FeatureManager(FeatureMgr) 206, Interaction Manager(InteractionMgr) 208, Call Forwarding Don't Answer (FeatureCFD) 210, other related features (FeatureOther) 212, and, a Feature Data Base (FeatureDB) 214.

The TrafficMgr 202 contains software and hardware which handles new call setups. During new call setup, the TrafficMgr 202 uses data received from the FeatureCFD 210 or FeatureOther 212 via the FeatureMgr to set up the call. The TrafficMgr 202 also contains analysis tables that are used to determine where an address is located, and also if an address has any terminating features. The TrafficMgr 202 is able to query an address's subscriber line to determine if the line is idle, busy or congested. In addition, the TrafficMgr 202 initiates the CFD timer for base addresses with CFD active.

The ConnectionMgr 204 manages the physical connection between subscribers. The ConnectionMgr 204 can create a connection between subscribers or break an already established connection. The FeatureMgr 206 manages instructions received from the FeatureCFD 210, FeatureOther 212, or InteractionMgr 208, by requesting action of the ConnectionMgr 204, TrafficMgr 202, or InteractionMgr 208. The InteractionMgr 208 performs the function of resolving conflicts between two features which are performing actions on the same call. The InteractionMgr 208 insures that only one feature at a time has control over a call.

The FeatureCFD 210 contains the logic necessary to control the CFD Look Ahead function. The FeatureOther 212 block is a generic representation of other features which interact with the FeatureCFD 210. FeatureOther 212 can be one of two types: (1) A Call Setup type feature, in which invoking the feature will result in a call which must be setup with the Call Setup results determined by the Feature CFD 210, or, (2) a Non-call type Setup feature, in which the feature will not necessitate a call to be setup. The FeatureDB 214 contains the database which contains information, e.g. a remote address for forwarding, about a subscriber connected with a feature provided by the FeatureCFD 210 or FeatureOther 212 blocks.

The present invention provides a method and system in which a subscriber calling a CFD subscriber will not hear a ring tone followed by a confusing busy or congestion tone in the problem situations discussed previously. When the CFD subscriber fails to answer the call within the specified time, CFD time-out occurs and the CFD feature uses a Look Ahead mechanism to determine if the call can be successfully forwarded. The Look Ahead mechanism consists of breaking the through connection between the originating and base addresses, setting up a call toward the remote address, and waiting for the results of the call setup before terminating the ring tone at the originating address. The system continues to supply the ring tone to the originating address and ring the base address after the through connection is broken. Three types of Call Setup results can be received; successful, unsuccessful, or feature pointed out.

FIG. 3 is a table categorizing Call Setup System events which occur during implementation of the Call Forwarding Don't Answer Look Ahead feature. If the Call Setup result is successful, the originating and remote addresses are through connected (the call is forwarded), and the base address is released. The ringing at the base address will be terminated and the originating address will be suplied ringtone from the new through connection. If the result is unsuccessful, the originating and base address will be reconnected after having been disconnected during the Call Setup (non-forwarding call treatment is applied). If the result is feature pointed out, the feature pointed out is seized to continue the call setup. The CFD feature will remain in the call to oversee the call setup. The CFD feature receives the results of the subsequent call setup(s) and acts on the results in the same manner as it reacted to the initial call setup results. The LookAhead mechanism continues and the CFD feature will remain in the call until it receives either a successful or unsuccessful call setup result. In all these situations the CFD Look Ahead feature provides the calling subscriber with a steady ring tone.

Figure 4:
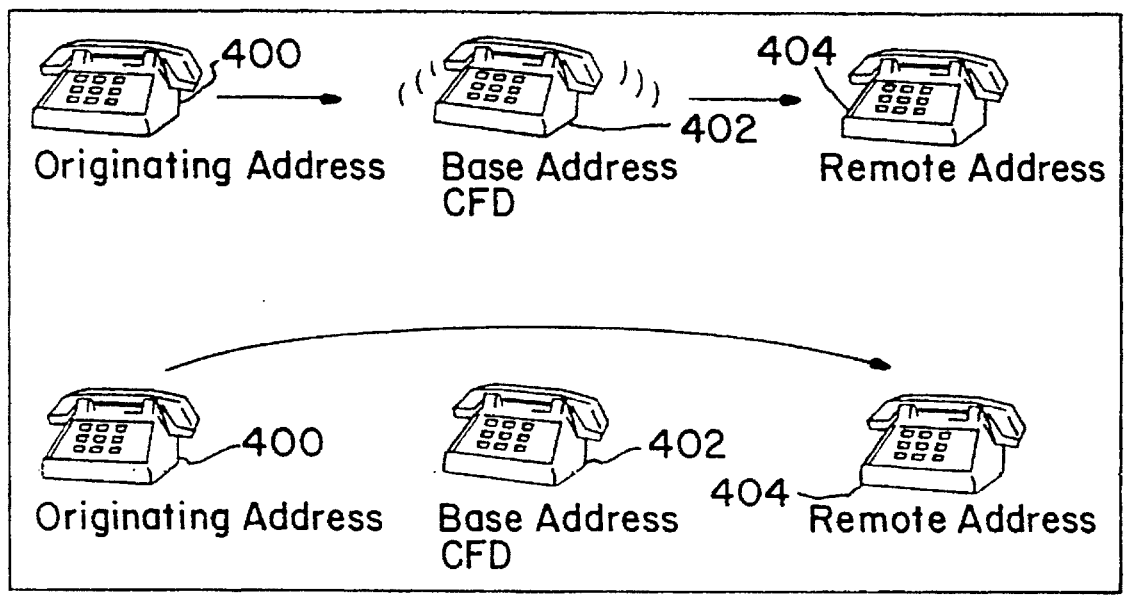
FIG. 4 illustrates a call scenario for a successful call setup result.

FIGS. 4–8 illustrate possible scenarios in which the CFD Look Ahead feature will provide the originating address with a steady ringtone. FIG. 4 illustrates a call scenario for a successful call setup result. The originating address 400 calls the base address 402. The base address has the feature Call Forwarding Don't Answer (CFD) to the remote address 404. When the base address 402 fails to answer within the specified amount of time, CFD time-out occurs and a call setup is attempted to the remote address 404. The through connection system event is received indicating that through connection of the source address to the remote address 404 occurred. This is a successful call setup result so the remote address 404 starts ringing, indicating the completion of through connection between the originating address 400 and the remote address 404. The base address 402 is then disconnected and stops ringing.

Figure 5:
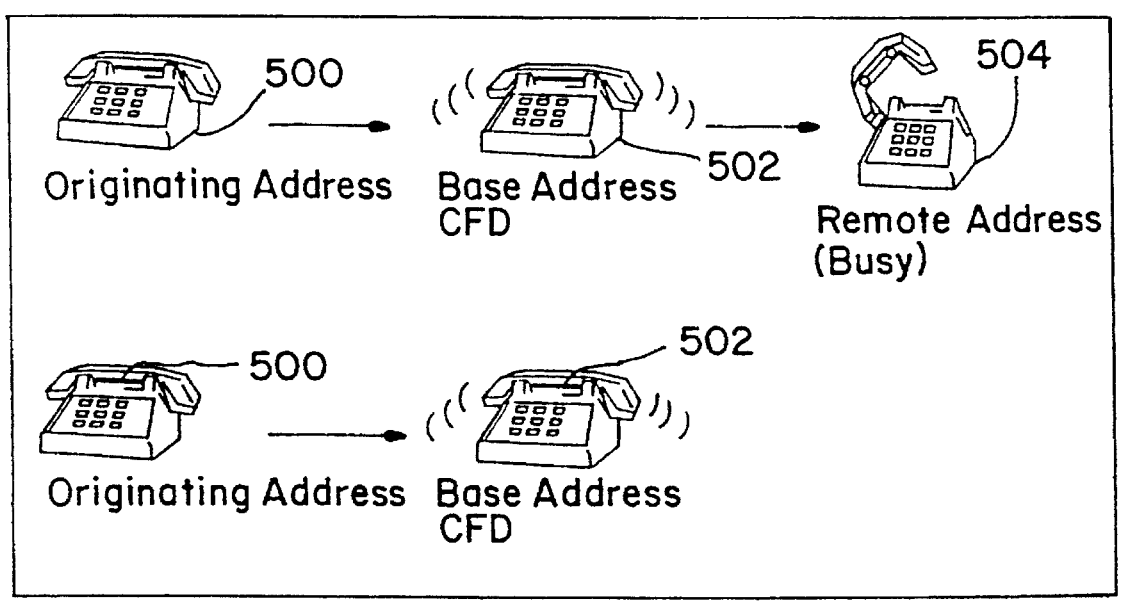
FIG. 5 illustrates a call scenario for an unsuccessful call setup result.

FIG. 5 illustrates one call scenario for an unsuccessful call setup result. The originating address 500 calls the base address 502. The base address 502 has the CFD feature to the remote address 504. Then the base address 502 fails to answer within the specified amount of time, CFD time-out occurs and a call setup is attempted to the remote address 504. The busy subscriber system event is received which is an unsuccessful call setup result so the base address 502 continues ringing until answer or until the originating address 500 disconnects.

Figure 6:
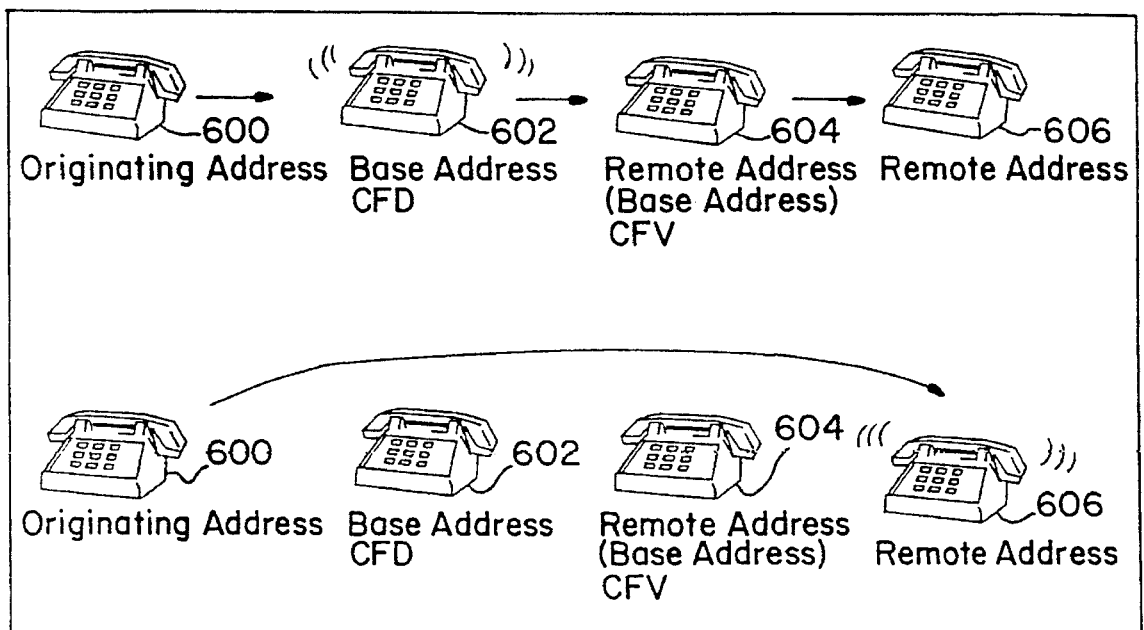
FIG. 6 illustrates a call scenario for a feature pointed out call setup result.

FIG. 6 illustrates one call scenario in which the first result received from the attempted call setup to the first remote address 604 is a feature pointed out which is a call setup type feature. The second result received from the attempted call setup to the second remote address 606 is successful. The originating address 600 calls the base address 602. The base address 602 has the feature CFD to the first remote address 604. The first remote address 604 has the Call Forwarding Variable (CFV) feature to the second remote address 606. The base address 602 fails to answer within the specified amount of time, CFD time-out occurs and a call setup is attempted to the first remote address 604. The feature pointed out system event is received indicating the CFV feature. The CFV feature is invoked which performs a call setup to the second remote address 606. The through connection system event is received indicating that through connection of the originating address to the second remote address 604 occurred. This is a successful call setup result so the second remote address 606 starts ringing, indicating the completion of through connection between the originating address 600 and the second remote address 606. The base address 602 is then disconnected and stops ringing.

Figure 7:
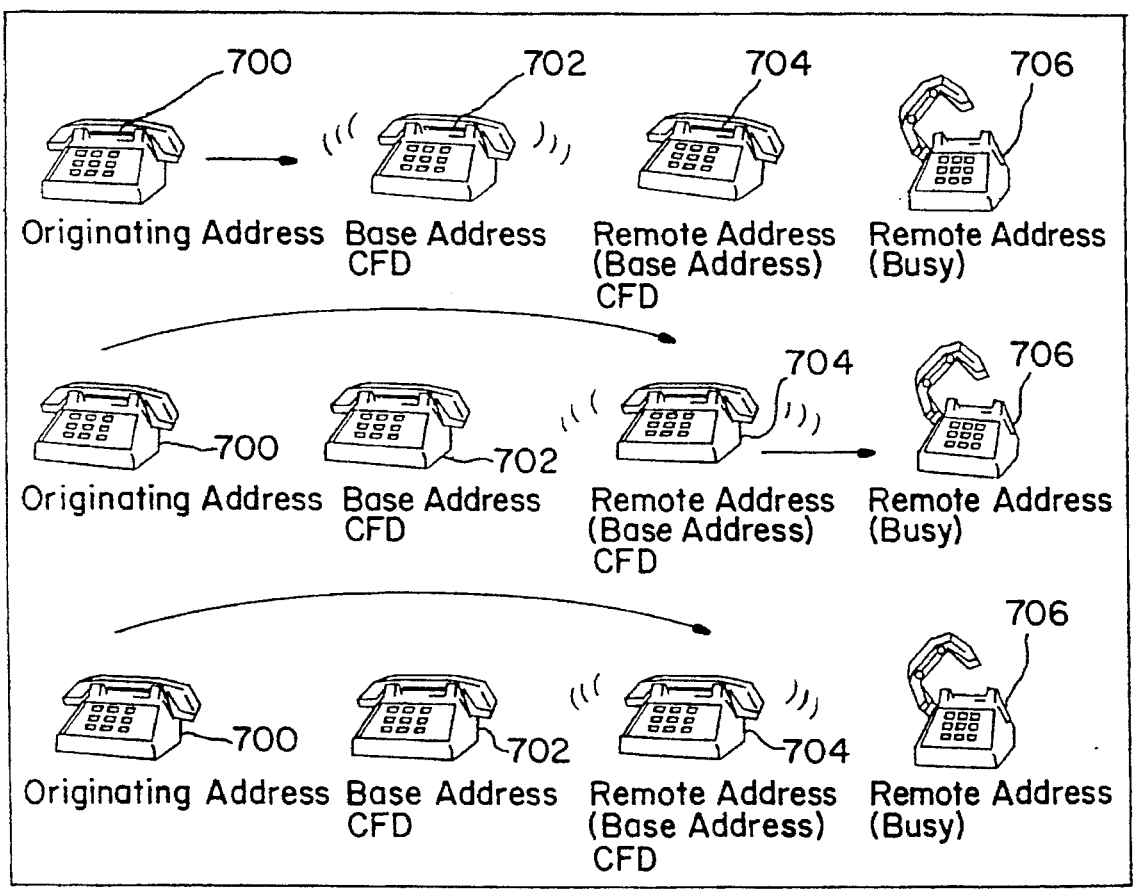
FIG. 7 illustrates a call scenario for a feature pointed out call setup result when there is more than one Call Forwarding Don't Answer subscriber in the call.

FIG. 7 illustrates one call scenario which shows how the Look Ahead mechanism functions when there is more than one CFD subscriber in the call. The originating address 700 calls the base address 702. The base address 702 has CFD to the first remote address 704. When the base address 702 fails to answer within a specified amount of time, CFD time-out occurs and the call setup is attempted to the first remote address 704. The through connection system event is received indicating that through connection of the originating address 700 to the first remote address 704 occurred. This is a successful call setup result so the remote address 704 starts ringing, indicating through connection between the originating address 700 and the first remote address 704. The base address 702 is then disconnected and stops ringing. The Look Ahead mechanism for the first base address 702 has been concluded. When the first remote address 704 fails to answer within the specified amount of time, CFD time-out occurs and a call setup is attempted to the second remote address 706. The busy subscriber system event is received which is an unsuccessful call setup result so the first remote address 704 continues ringing until answer or until the originating address 700 disconnects. From this example it can be seen that the look ahead is done for each CFD time-out that occurs.

When non-call setup type features are pointed out, it is known, due to their nature, that the result of any further call setup will be successful or unsuccessful (the end of any sequential forwarding chain is reached). In these cases the CFD feature need not remain in the call. Instead, depending on the feature pointed out, the base address is disconnected (the call is forwarded) or the base address continues to ring until answer or until the originating address disconnects (non-forward call treatment is applied).

As an example, if the Interception Service feature (IS) is pointed out, it is known that the call setup result will be unsuccessful. Therefore the call is not forwarded, and the base address continues ringing. Conversely, if the Meet-Me Conference (MMC) feature is pointed out, it is known that the call setup result will be successful. Therefore the base address is disconnected, and the MMC feature is invoked (the CFD feature does not remain in the call).

In these cases, the Look Ahead mechanism is not in effect until the successful or unsuccessful call setup result is actually received, but until it is known that the successful or unsuccessful call setup result is inevitable.

Figure 8:
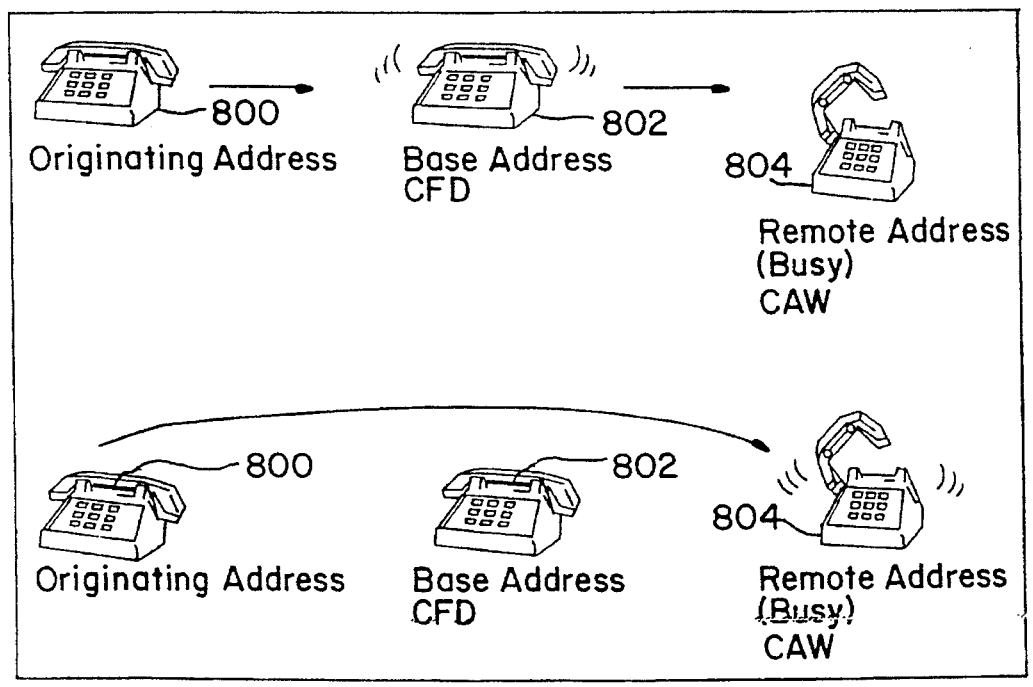
FIG. 8 illustrates a call scenario for a feature pointed out call setup result when a feature other than another forwarding feature is pointed out.

FIG. 8 illustrates one call scenario where a non-call setup type feature is pointed out. The originating address 800 calls the base address 802. The base address 802 has CFD to the remote address 804. The remote address 804 is busy and has the Call Waiting (CAW) feature active. The base address 802 fails to answer within the specified amount of time, CFD time-out occurs and a call setup is attempted to the remote address 804. A feature pointed out system event is received which indicates that the CAW is active at the remote address. The CFD feature frees the remote address and drops from the call since CAW is a non-call setup type feature. The CAW feature is seized. The CAW feature provides the Call Waiting tone to the remote address 804 and provides ring tone to the originating address 800 and takes over the call.

FIGS. 9A and 9B are tables which illustrates the signals interchanged between the functional blocks of FIG. 2 when actions are taken by feature software in the preferred embodiment of the invention.

Referring first to FIG. 9A, the CFDTimerExpires signal is sent by the TrafficMgr 202 to inform the FeatureMgr 306 that the ring limit of the CFD base address has been reached and that CFD should be invoked. The SeizeFeature signal is sent by the FeatureMgr 206 or InteractionMgr 208 to order the FeatureCFD 210 or FeatureOther 212 to handle a call. The FeatureSeized signal is sent to the FeatureMgr 206 by the FeatureCFD 210 or FeatureOther 212 to acknowledge that the feature has been seized. The ReadFeatData signal is sent by the FeatureCFD 210 or FeatureOther 212 to the FeatureDB 214 in order to read data connected with a subscriber's feature. The FeatData signal is sent in response to the ReadFeatData signal and contains the subscriber data. The ReleaseFeature signal is sent by the FeatureCFD 210 or FeatureOther 212 to the FeatureMgr 308 to indicate that they no longer need to handle a call. The FeatureReleased signal is sent from the FeatureMgr 206 to the FeatureCFD 210 or FeatureOther 212 to acknowledge that the feature has been released.

The WriteSetupData signal is sent by the FeatureCFD 208 or FeatureOther 210 to the FeatureMgr 206, or the FeatureOther to the InteractionMgr 208 to write Call Setup data to the TrafficMgr 202. The FeatureMgr 206 or InteractionMgr 208 relays the data to the TrafficMgr 202 with the WriteSetupData signal.

A CreateCall signal is sent from the FeatureCFD 210 or FeatureOther 212 to FeatureMgr 306 to order that a call be setup between two addresses. A SetupNewCall signal is sent from the FeatureMgr 306 to the TrafficMgr 202 in order to setup a call ordered by a feature. The Connect signal is used by the TrafficMgr 302 to order the ConnectionMgr 204 to connect two addresses specified in a SetupNewCall signal if the called address is not busy, doesn't have a Call Setup type feature, or congestion doesn't prevent the through connection. The Connected signal is sent from the ConnectionMgr 302 to the TrafficMgr 304 to acknowledge that a through connection has been made. After a connection has been made the calling subscriber hears ring tone and the called address is ringing. If the called address goes off hook after connection, a speech connection is made. The ThroughConnect is sent from the TrafficMgr 302 to the FeatureMgr 306 to acknowledge that a SetupnewCall signal has been acted upon. The CallSetup(success) signal is sent from the FeatureMgr 306 to the FeatureCFD 210 or FeatureOther 212 to Indicate that a CreateCall signal was successfully acted upon.

The Busy/CongestedSub signal is sent by the TrafficMgr 202 to indicate to the FeatureMgr 206 that the call setup attempt is to a busy subscriber, or, that the line is congested. The CallSetup(failure) signal is sent by the FeatureMgr 206 to the FeatureCFD or FeatureOther 214 after receiving a Busy/Congested/Sub signal to indicate an unsuccessful Call Setup.

The FeaturePointedOut signal is sent by the TrafficMgr 202 to the FeatureMgr 206 to indicate that the Call Setup attempt is to an address with a feature active. The FeaturePointedOut signal indicates whether the feature pointed out is a Call Setup type or Non-call Setup type feature.

Referring now to FIG. 9B, the Split signal is sent from the FeatureCFD to order that the connection between two subscribers be broken. After the connection between the two subscribers is broken, each subscriber will continue to hear any tones the system was providing to them during through connection (e.g. a calling subscriber will continue to hear ringing and the called address will continue to ring). If the Called address goes off hook after the through connection is broken a dial tone is provided to that address. The BreakConnection signal is sent to the ConnectionMgr 204 by the FeatureMgr 206 to implement the Split signal. The ConnBroken is sent from the ConnectionMgr 204 to the FeatureMgr 206 to acknowledge that a through connection has been broken. The SplitR is sent from the FeatureCFD 206 to the FeatureCFD to acknowledge that a Split signal has been acted upon. The Free signal is sent from the FeatureCFD 210 to the FeatureMgr 206 in order to free the base address when it has had its speech path disconnected as the result of a split signal and is still ringing. A Freed signal is sent by the FeatureMgr 206 to the FeatureCFD to acknowledge that the Free signal has been acted upon. The Release signal is sent from the FeatureMgr 206 to the ConnectionMgr 204 in order to implement a Free signal. The Released signal is sent by the ConnectionMgr to acknowledge that a Release signal has been acted upon. The Join signal is sent by the FeatureCFD 210 to order the FeatureMgr 206 to reconnect two addresses which have been disconnected by a Split signal. The Joined signal is sent by the FeatureMgr 206 to the FeatureCFD 210 to acknowledge that a Join signal has been acted upon.

The Handover(feature, concurrent) signal is used by the FeatureCFD 210 or FeatureOther 212 to instruct the FeatureMgr 206 to handover a call to another feature. On a concurrent handover the feature ordering the handover remains in the call and receives subsequent Call Setup results. The Handover(feature, chained) signal is used by the FeatureCFD 210 or FeatureOther 212 to instruct the FeatureMgr 206 to handover a call to another feature. On a chained handover the feature ordering the handover drops from the call. The SeizeInteractionLogic signal is sent by the FeatureMgr 206 to order the Interaction Mgr 208 to handle a concurrent handover. The LogicSeized signal is sent by the InteractionMgr 208 to acknowledge that the SeizeInteractionLogic signal has been acted upon.

Figure 10:
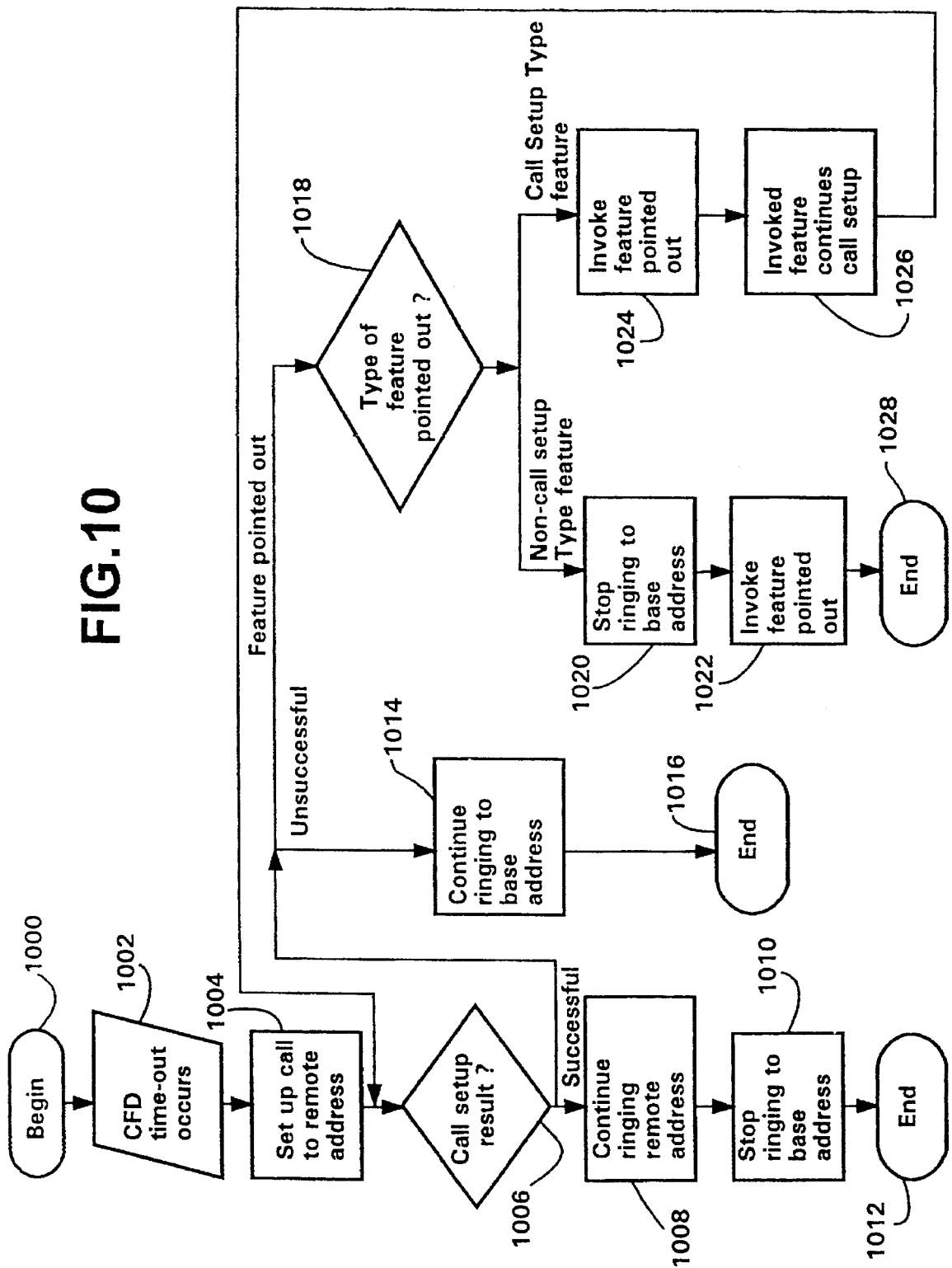
FIG. 10 is a flow chart illustrating the functions performed by Call Forwarding Don't Answer Look Ahead software when initiating call processing in accordance with the teachings of the present invention.
Figure 11A:
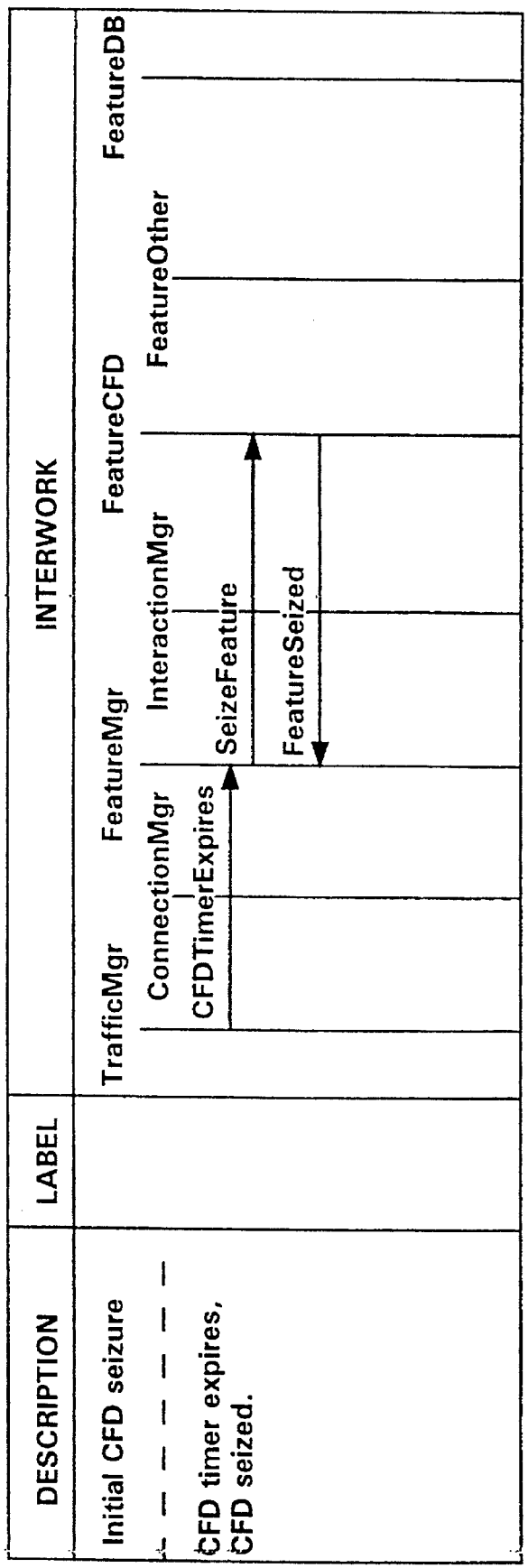
FIG. 11A is a signal flow diagram which illustrates the exchange of signals between the functional blocks of FIG. 2 as the CFD Look Ahead Software is invoked.

FIG. 10 is a flow chart which illustrates the steps followed by the CFD Look Ahead Software when a call addressed to a base address with CFD activated is received in the system. At Step 1000 the call is received in the system, a through connection is made from the originating address to the base address and the CFD timer is started. At Step 1002 the CFD timer expires and the CFD software is invoked. Referring temporarily to FIG. 11A there is shown a signal flow diagram which illustrates the exchange of signals between the functional blocks of FIG. 2 as the CFD Look Ahead software is invoked. The TrafficMgr 202 sends a CFD Timer Expires signal to the FeatureMgr 206 to indicate the expiration of the CFD timer. The FeatureMgr 206 then invokes the CFD Look Ahead feature by sending a SeizeFeature signal to the FeatureCFD 210. The FeatureCFD 210 returns a FeatureSeized signal back to the FeatureMgr 206 to acknowledge seizure.

Figure 11B:
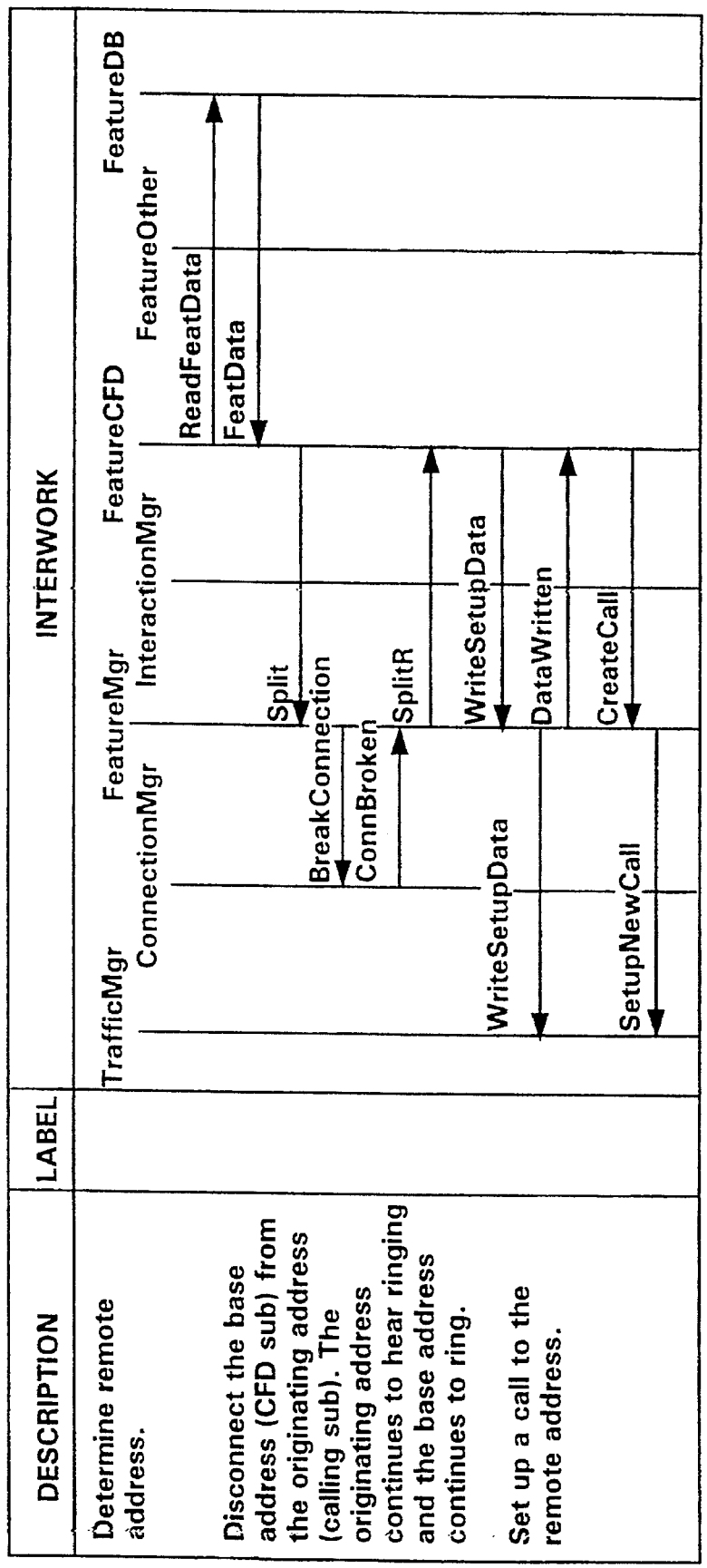
FIG. 11B is a signal flow diagram which illustrates the exchange of signals between the functional blocks of FIG. 2 during CFD Look Ahead Call Setup.

Referring again to FIG. 10, from Step 1002 the CFD feature software moves to Step 1004 and sets up a call to the remote address for CFD. This Call Setup is illustrated in more detail in FIG. 11B which is a signal flow diagram illustrating the exchange of signals between the functional blocks of FIG. 2 during FeatureCFD Look Ahead call setup of Step 1004. To setup a call the FeatureCFD 210 sends a ReadFeatData to the FeatureDB 214 to retrieve Feature Data on the CFD subscriber. The feature data is then sent to the FeatureCFD 210 in response in a FeatData message. The FeatureCFD 210 then splits the base address and originating address by sending a split signal to the FeatureMgr 206. The FeatureMgr 206 sends a BreakConnection signal to the ConnectionMgr 204 to instruct the ConnectionMgr 204 to break the through connection between the base address and originating address. When the through connection is broken the ConnectionMgr 204 returns a ConnBroken message to the FeatureMgr 206. The FeatureMgr 206 then informs the FeatureCFD 210 that the split is complete by sending a SplitR to the FeatureCFD 210. Once the base address and the originating address are split, the base address continues to ring until the ringing is terminated. Termination of the ringing and reconnection are to be described further on. If the base address goes off hook after the split is complete and before reconnection or termination of ringing, a dial tone is provided to the base address. The base address may originate a call during this time. The FeatureCFD 210 now writes the feature data to the FeatureMgr 206 with a Write SetupData signal. The Write SetupData signal is relayed by the FeatureMgr 206 to the TrafficMgr 202 and the FeatureMgr 206 sends a DataWritten acknowledgement to the FeatureCFD 210. The FeatureCFD 210 now sends a CreateCall signal to the FeatureMgr 206, and the FeatureMgr 206 sets up the call by sending a SetupNewCall Signal to the TrafficMgr 202. The Call Setup will result in one of three messages being returned to the FeatureCFD 210.

Figure 11C:
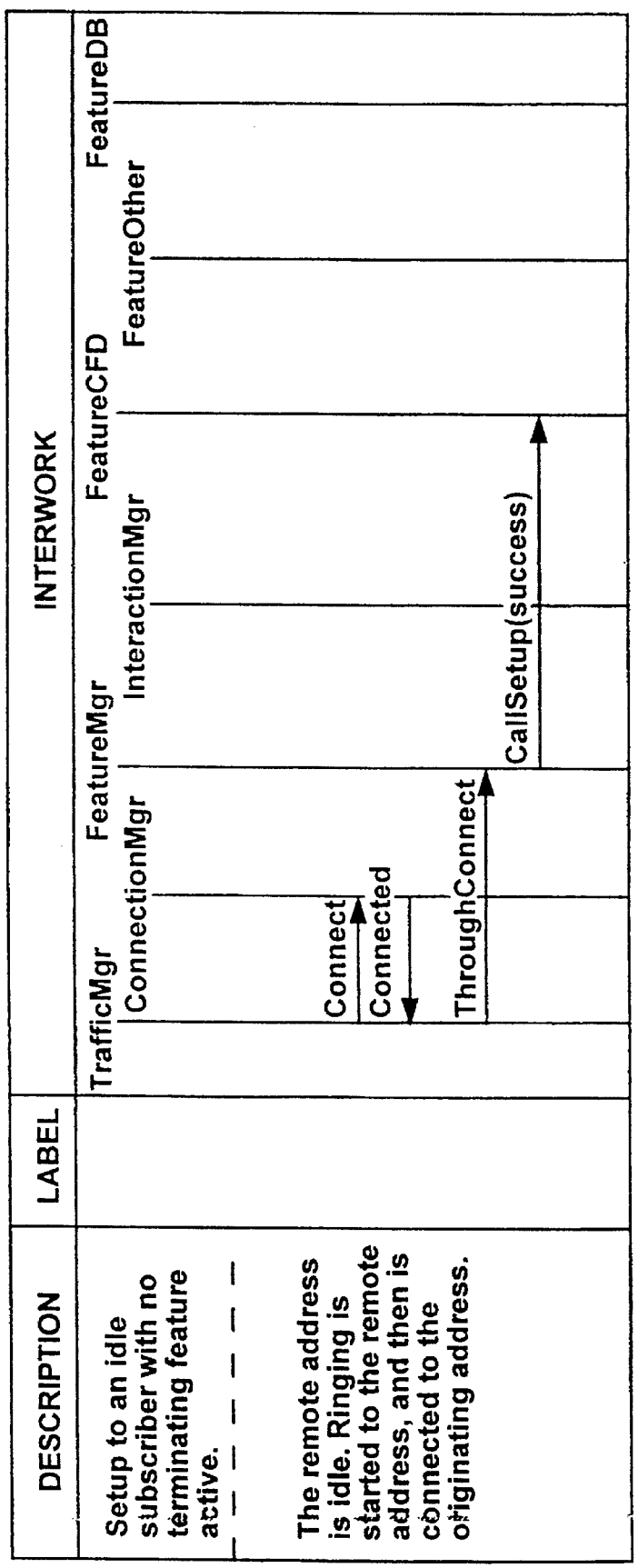
FIG. 11C is a signal flow diagram which illustrates the exchange of signals during call setup between the functional blocks of FIG. 2 when the remote subscriber is idle with no terminating feature.

In the first scenario for Call Setup, the remote subscriber is idle with no terminating feature. FIG. 11C is a signal flow diagram which illustrates the exchange of signals between the functional blocks of FIG. 2 when the remote subscriber is idle with no terminating feature. Upon determining that the remote subscriber is idle, the TrafficMgr 202 sends a Connect signal to the ConnectionMgr 204 to create a through connection between the base address and remote address. The ConnectionMgr 204 acknowledges the connection by returning a Connected signal to the TrafficMgr 202. The TrafficMgr 202 then sends a ThroughConnect signal to the FeatureMgr 206 which in turn informs the FeatureCFD of the setup result with a CallSetup(Success) Signal.

In the second scenario for Call Setup, the remote subscriber is busy or congested and has no terminating feature active. FIG. 11D is a signal flow diagram which illustrates the exchange of signals between the functional blocks of FIG. 2 when the remote subscriber is busy or congested. Upon determining that the remote subscriber is busy or congested with no feature active, the TrafficMgr 202 sends a Busy/Congested Sub signal to the FeatureMgr 206. The FeatureMgr 206 then sends a CallSetup(Failure) signal to the FeatureCFD 210 to indicate an unsuccessful call setup.

In the third possible scenario for a Call Setup, the remote address has a terminating feature active. FIG. 11E is a signal flow diagram which illustrates the exchange of signals between the functional blocks of FIG. 2 when the remote address has a terminating feature active. If the remote address has a terminating feature active the TrafficMgr 202 informs the FeatureMgr 206 by sending a FeaturePointedOut signal to the FeatureMgr 206. The FeatureMgr 206 then returns the Call Setup results to the FeatureCFD 210 with a CallSetup(Feature) signal.

Referring again to FIG. 10, after the Call Setup to the remote address, the CFD feature software moves to Step 1006 where the Call Setup result is determined and appropriate action is initiated.

If the FeatureCFD 210 has received a CallSetup(Success) signal, the CFD software moves from Step 1006 to Step 1008. At Step 1008 the software continues the ringing of the remote address initiated during the Call Setup. From Step 1008 the software moves to Step 1010 and terminates ringing of the base address. The process then ends at Step 1012. Referring temprarily to FIG. 11F, there is shown a signal flow diagram which illustrates the signals between the functional blocks of FIG. 2 when the Call Setup result is successful. Upon receiving the CallSetup(Success) signal the FeatureCFD 210 sends a free signal to the FeatureMgr 206 instructing it to release the base address. Ringing of the remote address will have started automatically when the through connection was made to the remote address. The FeatureMgr 206 sends a Release Signal to the ConnectionMgr 202 to release the base address. The base is released and ringing terminates. The ConnectionMgr 202 returns a Released signal to the FeatureMgr 206 to inform the FeatureMgr 206 of the release. The FeatureMgr 206, in turn, informs the FeatureCFD 210 that the base address is released by sending a Freed Signal to the FeatureCFD 210. The FeatureCFD 210 then sends a ReleaseFeature signal to the FeatureMgr 206 requesting release. The FeatureMgr 206 acknowledges release of the CFD feature by sending a FeatureReleased Signal to the FeatureCFD 210. The process has now ended.

Referring again to FIG. 10, if the CFCD 210 has received a CallSetup(Failure) signal at Step 1006, the CFD software moves from Step 1006 to Step 1014. At Step 1014 the software reconnects the originating and base address while the base address continues ringing. If the base address is off hook when the reconnection is atempted, a voice announcement is provided to the originating address stating the call cannot be completed. The process then ends at Step 1016.

Figure 11G:
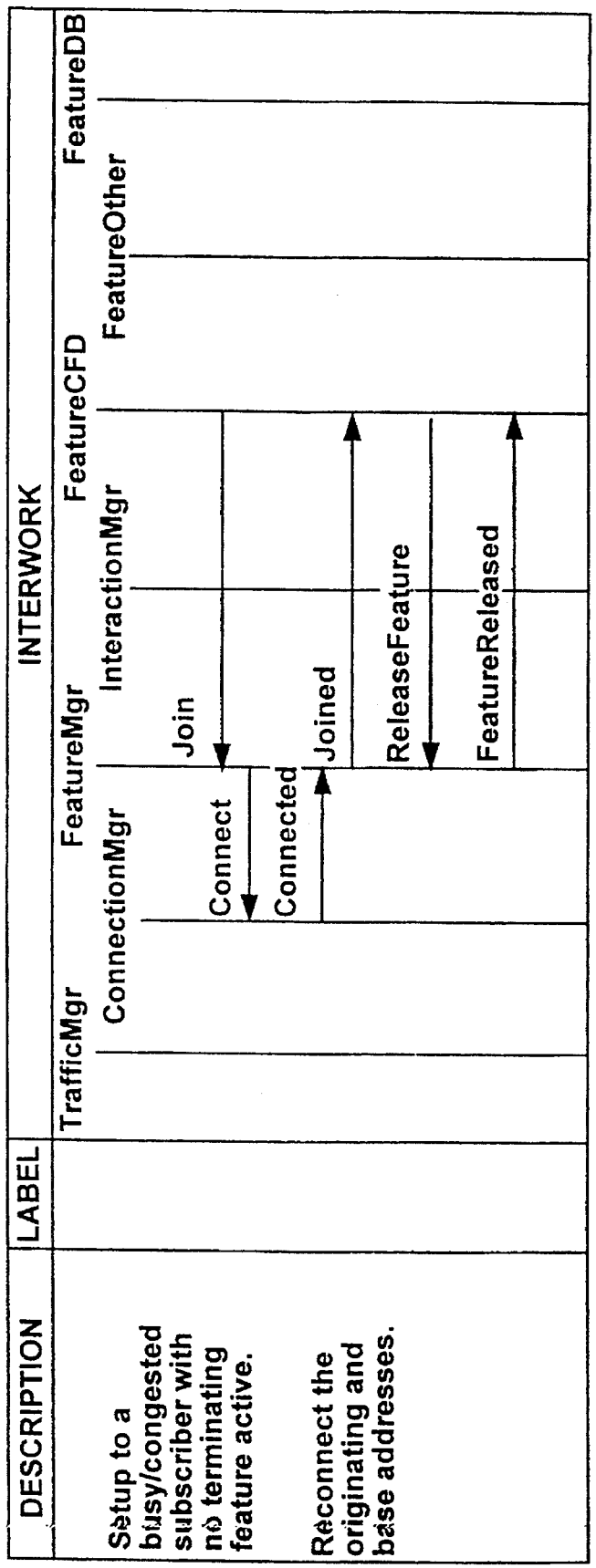
FIG. 11G is a signal flow diagram which illustrates the exchange of signals between the functional blocks of FIG. 2 when the Call Setup result is unsuccessful.
Figure 11:
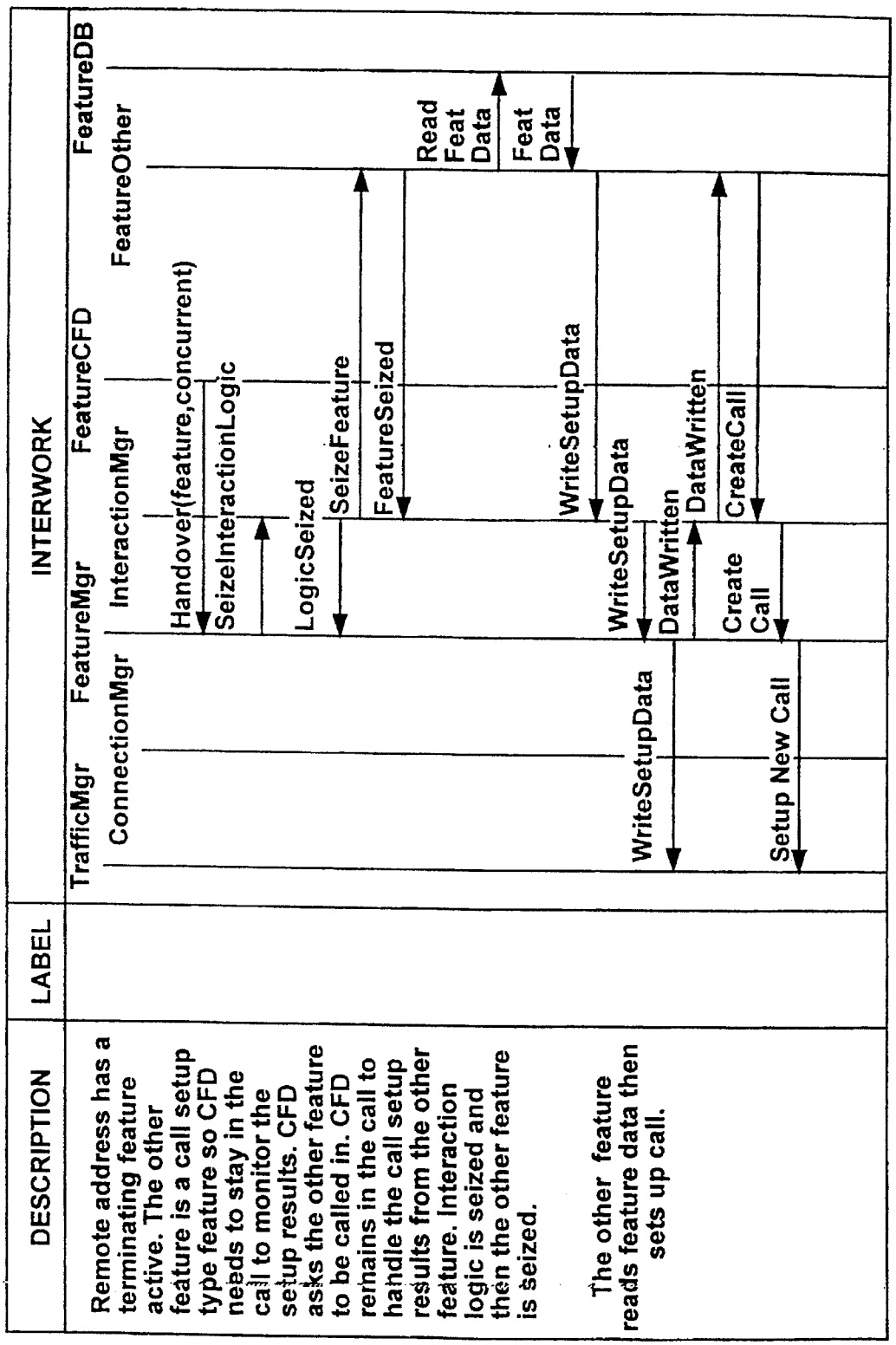
FIG. 11D is a signal flow diagram which illustrates the exchange of signals during call setup between the functional blocks of FIG. 2 when the remote subscriber is busy or congested.
FIG. 11E is a signal flow diagram which illustrates the exchange of signals during call setup between the functional blocks of FIG. 2 when the remote address has a terminating feature active.
FIG. 11F is a signal flow diagram which illustrates the exchange of signals between the functional blocks of FIG. 2 when the Call Setup result is a success.
FIG. 11H is a signal flow diagram which illustrates the exchange of signals between the functional blocks of FIG. 2 when the Call Setup result is feature pointed out, and, the feature pointed out is a Non-call Setup type feature.
FIG. 11I is a signal flow diagram which illustrates the exchange of signals between the functional blocks of FIG. 2 when the Call Setup result is feature pointed out, and, the feature pointed out is a Call Setup type feature.
FIG. 11J is a signal flow diagram which illustrates the exchange of signals between the functional blocks of FIG. 2 when the Call Setup by the feature pointed out is to a terminating subscriber who is idle with no terminating feature active.
FIG. 11K is a signal flow diagram which illustrates the exchange of signals between the functional blocks of FIG. 2 when the Call Setup by the feature pointed out is to a busy or congested subscriber with no terminating feature active.
FIG. 11L is a signal flow diagram which illustrates the exchange of signals between the functional blocks of FIG. 2 when the Call Setup by the feature pointed out is to a second feature pointed out.
FIG. 11M is a signal flow diagram which illustrates the exchange of signals between the functional blocks of FIG. 2 when the Call Setup by the feature pointed out has a successful result.
FIG. 11N is a signal flow diagram which illustrates the exchange of signals between the functional blocks of FIG. 2 when the Call Setup by the feature pointed out is unsuccessful.
FIG. 11O is a signal flow diagram which illustrates the exchange of signals between the functional blocks of FIG. 2, when the Call Setup result by the feature pointed out is a second feature pointed out.

FIG. 11G is a signal flow diagram which the signal exchange between the functional blocks of FIG. 2 when the Call Setup result is unsuccessful. Upon receiving the CallSetup(Failure) signal the FeatureCFD 210 sends a Join signal to the FeatureMgr 206. The FeatureMgr 206 then reconnects the originating and base address by sending a Connect signal to the ConnectionMgr 202. The reconnection is acknowledged by the ConnectionMgr 202 sending a Connected signal to the FeatureMgr 206 and the FeatureMgr 206, in turn, sending a Joined signal to the FeatureCFD 210. The FeatureCFD 210 then sends a ReleaseFeature signal to the FeatureMgr 206 requesting release. The FeatureMgr acknowledges release of the CFCD feature by sending a FeatureReleased Signal to the CFCD 210. The process has now ended.

Referring again to FIG. 10, if the CFCD 210 has received a CallSetup(Feature) signal, the CFCD software moves from Step 1006 to Step 1018 to determine whether a Call Setup or Non-call Setup type feature was pointed out. If it is determined, at Step 1018, that the feature pointed out is a Non-call Setup type feature, the software moves to Step 1020. At Step 1020 the CFD software disconnects the base address. From step 1020 the software moves to step 1022. At 1022 the software invokes the feature pointed out and drops from the call. The software then moves to Step 1028. At Step 1028 the CFD Look Ahead process ends as the feature pointed out continues the call.

FIG. 11H is a signal flow diagram which illustrates the exchange of signals between the functional blocks of FIG. 2 when the setup result is feature pointed out, and, the feature pointed out is a Non-call Setup type feature. The FeatureCFD 210 sends a Free signal to the FeatureMgr 206 to initiate the release of the base address. The FeatureMgr 206 then sends a Release signal to the ConnectionMgr 202. The ConnectionMgr 202 releases the base address and the base address stops ringing. The ConnectionMgr 302 then acknowledges the release of the base address to the FeatureMgr 206 by returning a Released signal to the FeatureMgr 206. The FeatureMgr 206, in turn, informs the FeatureCFD of the release by sending a Freed signal to the FeatureCFD 210. The FeatureCFD now hands over the call to the Non-call Setup type feature pointed out by sending a Handover(feature, chained) signal to the FeatureMgr 206. After handover, the FeatureCFD requests to be released by sending a ReleaseFeature signal to the FeatureMgr 206. The FeatureMgr 206 releases the FeatureCFD and sends a FeatureReleased signal in acknowledgement. The FeatureMgr then sends a SeizeFeature signal to the FeatureOther 212. The FeatureOther 212 will be seized and take over the call as the CFCD process ends.

Referring again to FIG. 10, if the feature pointed out is a Call Setup type feature, the software moves to Step 1024. At 1024 the software invokes of feature which has been pointed out. The invoked feature then continues the Call Setup at 1026. FIG. 11I is a signal flow diagram which illustrates the signal exchange between the functional blocks of FIG. 2 when the Call Setup result is feature pointed out and the feature pointed out is a Call Setup type feature. After receiving the CallSetup(Feature) signal the FeatureCFD 210 instructs the FeatureMgr 206 with a Handover(Feature, concurrent) signal to hand over call setup to the FeatureOther 212. The FeatureMgr 206 then seizes the Interaction logic by sending a SeizeInteractionLogic signal to the InteractionMgr 208. The InteractionMgr 208 sends an acknowledgement that the logic is seized by sending a LogicSeized signal to the FeatureMgr 206. The InteractionMgr 208 then seizes the other feature pointed out by sending a SeizeFeature signal to the FeatureOther 212. The FeatureOther 212 responds with a FeatureSeized signal to acknowledge the seizure. The FeatureOther 212 retrieves necessary data by sending a ReadFeatData signal to the FeatureDB 214. The FeatureDB 214 sends the FeatData response. The FeatureOther 212 then writes the Setup data to the InteractionMgr 208 with a WriteSetupData message. The setup data is sent from the InteractionMgr 208 to the FeatureMgr 206 with a WriteSetupData message and then relayed to the TrafficMgr 202 from the FeatureMgr 206 with a WriteSetupData message. The FeatureMgr 206 acknowledges that the Setup Data is written by sending a DataWritten signal to the InteractionMgr 208 and the InteractionMgr 208 relays the DataWritten signal to the FeatureOther 212. The FeatureOther 212 then sends a CreateCall signal to the InteractionMgr 210 to initiate Call Setup. The InteractionMgr 210 relays the CreateCall signal to the FeatureMgr 206. Upon receiving the CreateCall signal the FeatureMgr 206 sets up the call to the terminating subscriber by sending a SetupNewCall signal to the TrafficMgr 202.

During the Call Setup of Step 1026 (FIG. 10) the TrafficMgr 202 will return one of three messages to the FeatureMgr 206 depending upon the results of the new call setup by the other feature pointed out.

Figure 11J:
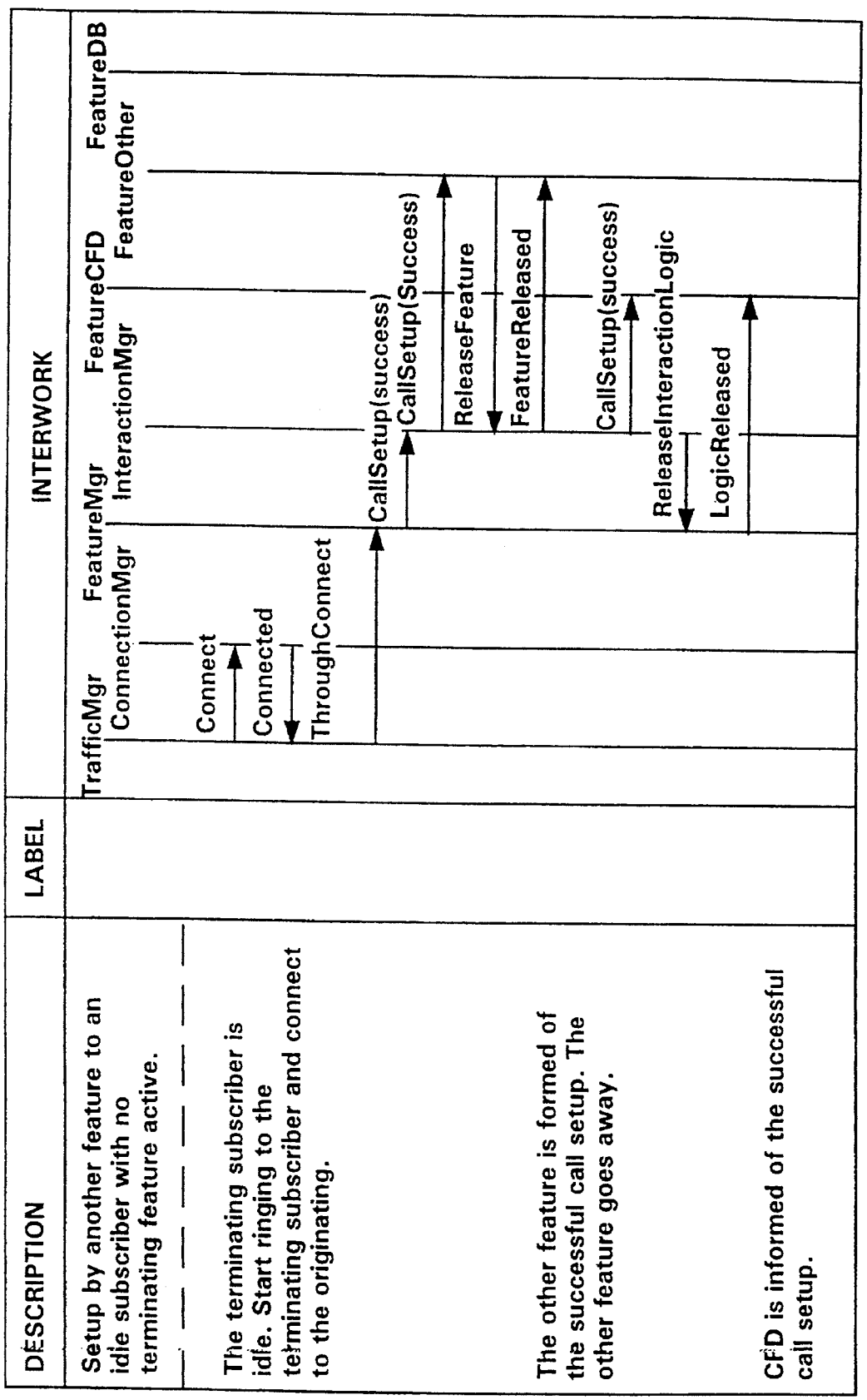

FIG. 11J is a signal flow diagram which illustrates the flow of signals between the functional blocks of FIG. 2 when the setup by the feature pointed out is to a terminating subscriber who is idle with no feature active. The TrafficMgr 202 will send a Connect signal to the ConnectionMgr 204. The ConnectionMgr 204 acknowledges the connection by sending a Connected acknowledgement signal to the TrafficMgr 202 in response. The terminating subscriber is now connected to the originating subscriber and ringing. The TrafficMgr 202 sends a ThroughConnect signal to the FeatureMgr 206 to indicate a through connection was made. The FeatureMgr 206 then sends a CallSetup(Success) signal to the InteractionMgr 208. The CallSetup(Success) signal is forwarded by the InteractionMgr 208 to the FeatureOther 212. Upon receipt of the CallSetup(Success) message, the FeatureOther 212 sends a ReleaseFeature request to the InteractionMgr 208. The InteractionMgr 208 releases the feature and sends a FeatureReleased signal to the FeatureOther 212. The InteractionMgr 208 then sends a CallSetup(Success) message to the FeatureCFD 210 to indicate a successful call setup. The InteractionMgr 208 also request release of the interaction logic by sending a ReleaseInteractionLogic signal to the FeatureMgr 206. The FeatureMgr 206 then informs the InteractionMgr 208 of the release of the interaction logic by sending a LogicReleased signal to the InteractionMgr 208.

Figure 11K:
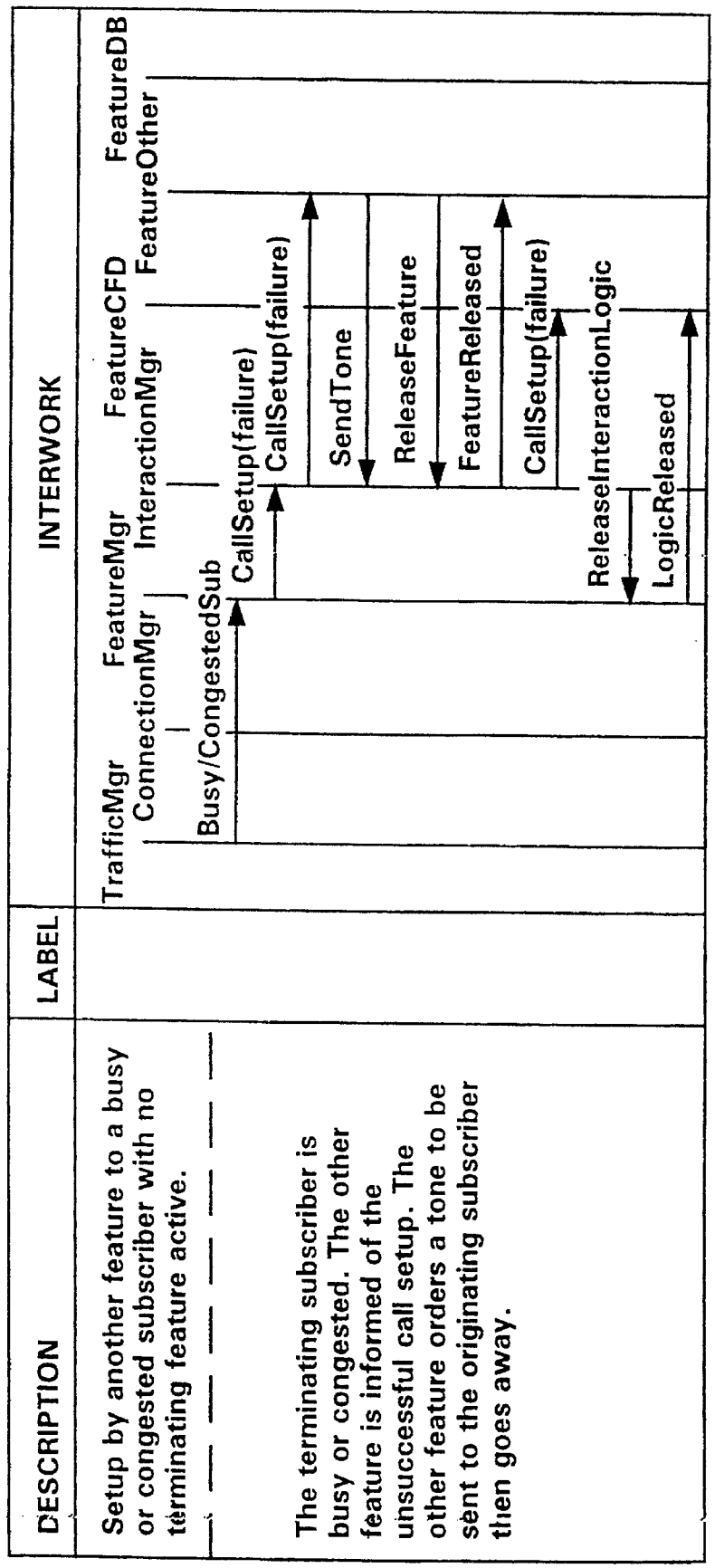

FIG. 11K is a signal flow diagram which illustrates the flow of signals between the functional blocks of FIG. 2 when the setup by the feature pointed out is to a busy or congested subscriber with no terminating feature active. The TrafficMgr 202 will send a Busy/CongestedSub signal to the FeatureMgr 206. The FeatureMgr 206 then sends a CallSetup(Failure) signal to the InteractionMgr 208. In turn the InteractionMgr 208 sends a CallSetup(Failure) signal to the FeatureOther 212. Upon receiving the CallSetup(Failure) signal the FeatureOther 212 sends a Send Tone signal to the InteractionMgr 208. The FeatureOther 212 then requests to be released by sending a ReleaseFeature signal to the InteractionMgr 208. The InteractionMgr 208 acknowledges release of the other feature by sending a FeatureReleased signal to the FeatureOther 212. The InteractionMgr 208 then returns the Call Setup results by sending a CallSetup(Failure) signal to the FeatureCFD 210 to indicate an unsuccessful call setup. The InteractionMgr 208 also sends a ReleaseInteractionLogic signal to the FeatureMgr 206 to request release of the interaction logic. The FeatureMgr 206 then informs the InteractionMMgr 208 of the release of the interaction logic by sending a LogicReleased-Signal to the InteractionMgr 208.

Figure 11L:
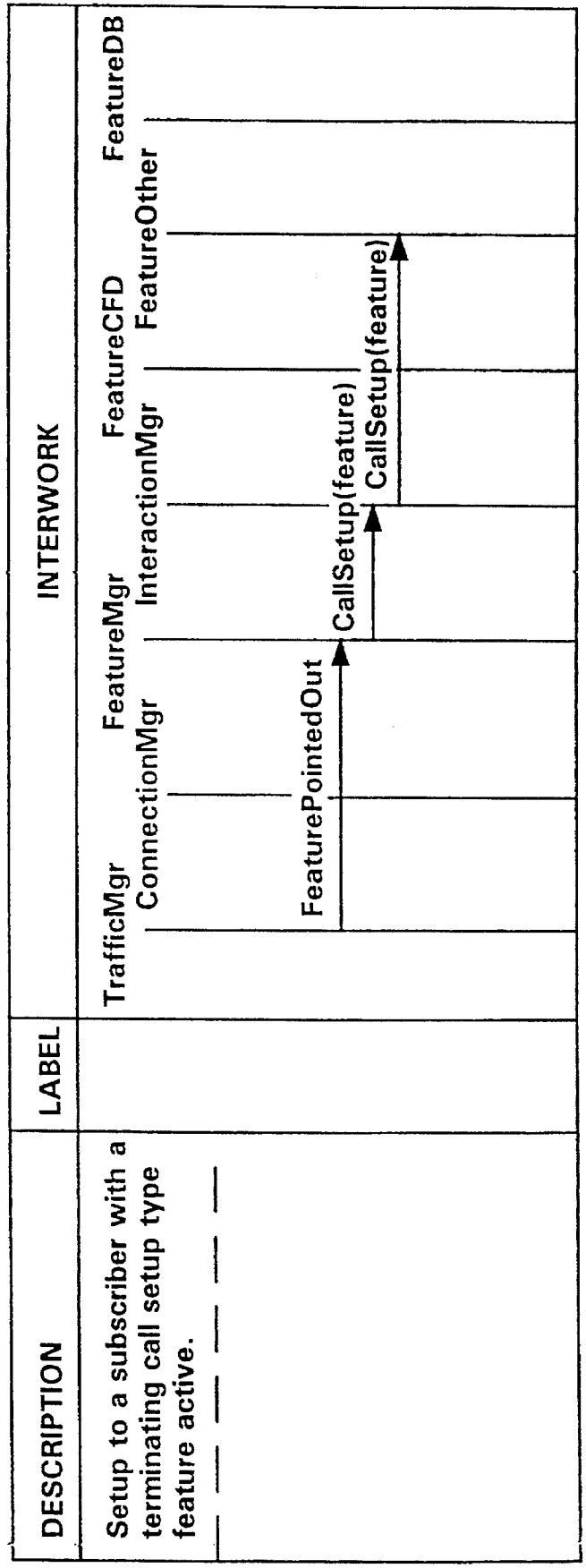

FIG. 11L is a signal flow diagram which illustrates the flow of signals between the functional blocks of FIG. 2 when the Call Setup result by the feature pointed out is a second feature pointed out. The TrafficMgr 202 sends a FeaturePointedOut signal to the FeatureMgr 206. The FeatureMgr 206 then informs the InteractionMgr 208 of the result with a CallSetup(feature) signal. The InteractionMgr 208 returns the Call Setup(feature) to the FeatureOther 212 and the FeatureOther 212 hands the call over to the feature pointed out Referring again to FIG. 10, from Step 1026, the Software returns to Step 1006. At 1006 the results of the Call Setup are determined. If the FeatureCFD has received a CallSetup-(Success) message indicating a successful call setup result by the feature pointed out at Step 1026, the CFD software moves to Step 1008. At Step 1008 the Software continues ringing of the terminating address initiated during Call Setup. From Step 1008 the software moves to Step 1010 and then terminates ringing of the base address. The process then ends at Step 1012.

Figure 11M:
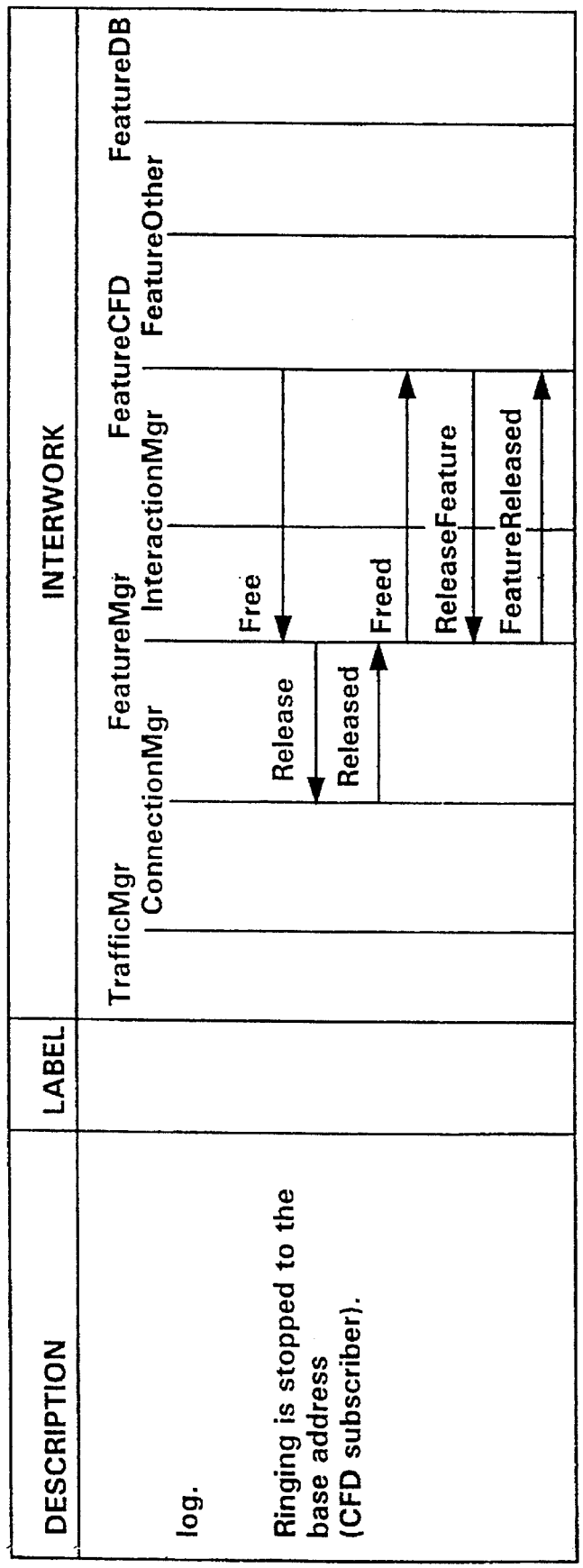

FIG. 11M shows the interchange of signals between the blocks of FIG. 2 when the Call Setup by the feature pointed out has a successful result. Ringing of the remote address will have started automatically when the through connection was made to the remote. After the interaction logic is released the FeatureCFD 210 sends a Free signal to the FeatureMgr 206 to initiate termination of ringing at the base address. The FeatureMgr 206 instructs the ConnectionMgr 204 to disconnect the base address by sending a Release signal to the ConnectionMgr 204. When the base address has been disconnected the ConnectionMgr 204 returns a Released signal to the FeatureMgr 206. The base address now stops ringing. The FeatureMgr 206 acknowledges that the base address is freed by sending a Freed signal to the FeatureCFD 212. The FeatureCFD 210 then requests to be released by sending a ReleaseFeature signal to the FeatureMgr 206. The FeatureMgr 206 acknowledges the release by returning a FeatureReleased signal to the FeatureCFD 210.

Referring again to FIG. 10, if the FeatureCFD 210 has received a CallSetup(Failure) signal, indicating an unsuccessful call setup result by the feature pointed out at Step 1026, the CFD software moves from Step 1006 to Step 1014. At Step 1014 the software continues ringing the base address and reconnects the base and originating address. The software then moves to Step 1016 where the process ends.

Figure 11N:
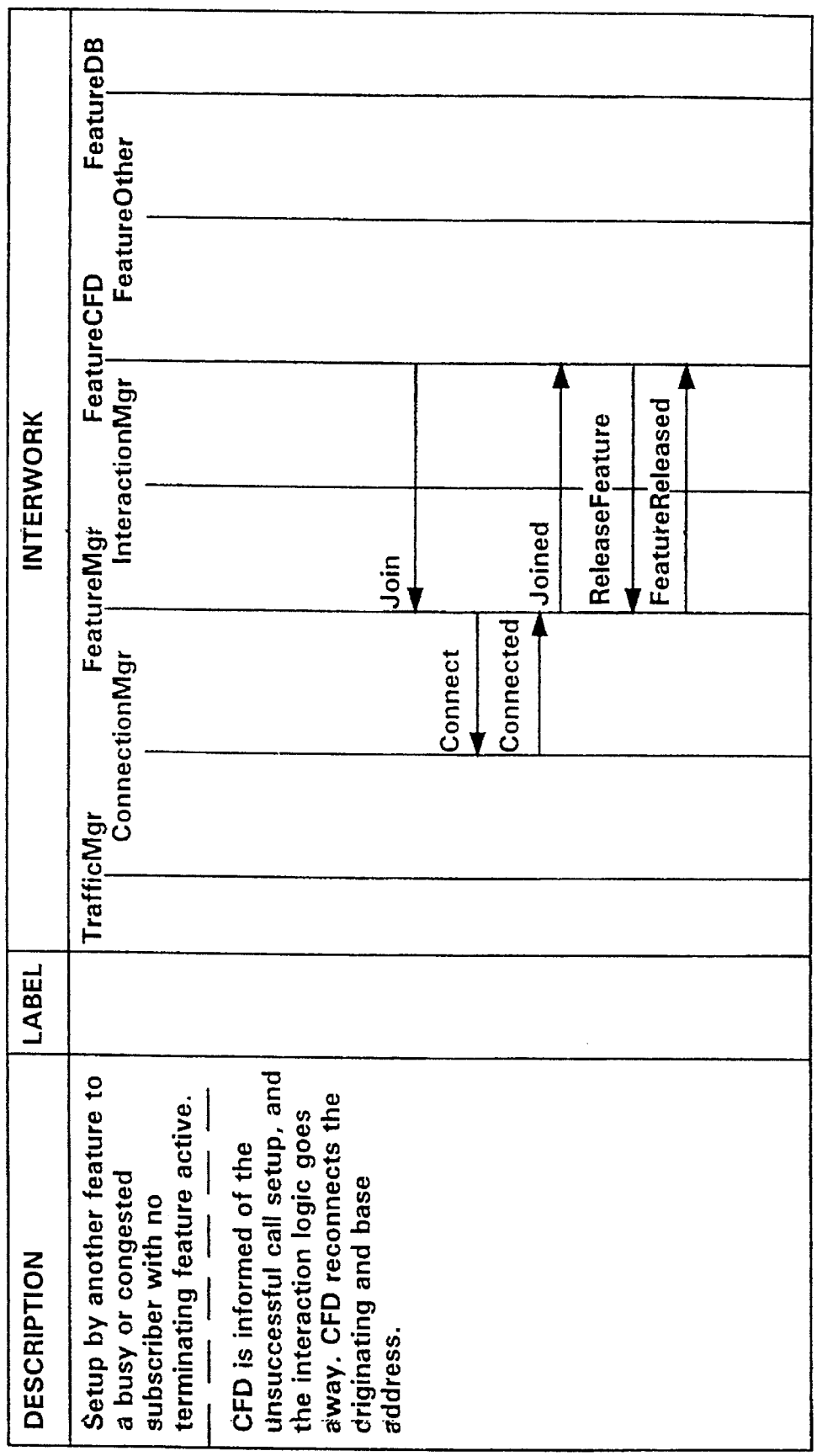

FIG. 11N shows the interchange of signals between the blocks of FIG. 2 when the Call Setup by the feature pointed out is unsuccessful result. After the interaction logic is released the FeatureCFD 210 initiates reconnection of the originating and base addresses by sending a Join signal to the FeatureMgr 206. The FeatureMgr 206 instructs the ConnectionMgr 202 to reconnect the originating and base addresses by sending a Connect signal to the ConnectionMgr 202. The ConnectionMgr 202 acknowledges the connection with a Connected signal sent back to the FeatureMgr 206. The FeatureMgr 206 then sends a Joined signal to the FeatureCFD 210 to inform the FeatureCFD 210 that the connection between the originating and base addresses was made. The FeatureCFD 210 requests to be released by sending a ReleasedFeature signal to the FeatureMgr 206. The FeatureMgr 206 releases the feature and sends a FeatureReleased signal back to the FeatureCFD 210. The process has now ended.

Referring again to FIG. 10, if the FeatureOther 212 has received a CallSetup(Feature) signal, indicating a second feature pointed out as a Call Setup result at Step 1026 by the first feature pointed out, the software will move from Step 1006 to Step 1018. At Step 1024 the second feature pointed out is invoked as the first feature pointed out hands the call over to the second feature. The invoked feature continues the call at Step 1026 and returns to Step 1006 as the first feature had. The CFD is not aware of this hand-over and is still waiting for a Call Setup result of successful or unsuccessful. The process continues as before, until a Call Setup result is reached at Step 1006 or Step 1018 which leads the process to end.

FIG. 11O is a signal flow diagram which illustrates the exchange of signals between the functional blocks of FIG. 2 when the Call Setup by the feature pointed out is a second feature pointed out which is a call setup type feature. The FeatureOther 216 sends a Handover(feature, chained) signal to the InteractionMgr 208. The FeatureOther 216 then requests to be released by sending a ReleaseFeature signal to the InteractionMgr 208. Upon releasing the feature, the InteractionMgr 208 sends a FeatureReleased signal to the FeatureOther 216 in acknowledgement. The InteractionMgr then sends a SeizeFeature signal to the FeatureOther 216. The FeatureOther 216 is now the second feature pointed out. The FeatureOther 216 responds to the InteractionMgr 208 with a FeatureSeized signal to acknowledge seizure of the feature. The process then continues as the FeatureOther 212 sets up a call.

It is believed that the operation and construction of the present invention will be apparent from the foregoing description and, while the method and apparatus shown and described herein has been characterized as being preferred, obvious changes and modifications may be made therein without departing from the spirit and scope of the invention as defined in the following claims.

What is claimed is:

1. A method of call forwarding in a communications system in which a plurality of subscriber stations are interconnected through a switch for communication with one another, said method comprising the steps of:

receiving in said switch a call from a first station of said plurality of subscriber stations, said call initially addressed to a second station of said plurality of subscriber stations;

establishing a through connection between said first station and said second station;

alerting said second station;

providing a ring tone to said first station;

disconnecting said through connection between said first station and said second station;

performing a call forwarding setup to a third station of said plurality of subscriber stations;

determining a result of said call forwarding setup; and forwarding said call in accordance with said call forwarding setup result, wherein said step of forwarding further comprises the step of re-establishing said through connection between said first station and said second station in response to a determination that the result of said call forwarding setup was unsuccessful.

2. The method of claim 1 wherein said step of forwarding includes the step of terminating an alert given said second station in response to a determination that said call forwarding setup was successful.

3. The method of claim 1 in which a successful call forwarding setup result includes an indication that said third station is idle.

4. The method of claim 1 in which an unsuccessful call forwarding setup result includes an indication that said third station is busy.

5. The method of claim 1 in which an unsuccessful call forwarding setup result includes an indication that said third station is not reachable because of congested lines.

6. The method of claim 1 wherein said step of forwarding includes the step of establishing a through connection between said first station and said third station in response to a determination that said call forwarding setup was successful.

7. The method of claim 6 wherein said step of establishing a through connection between said first station and said third station includes the step of alerting said third station.

8. The method of claim 1 wherein a subscriber service feature is associated with said third station and said step of forwarding includes the step of invoking the subscriber service feature in response to a determination that said call forwarding setup result points out the third station subscriber service feature.

9. The method of claim 8 wherein said step of invoking the subscriber service feature includes the steps of:

performing a second call forwarding setup being to a fourth station;

determining a result of said second call forwarding setup; and forwarding said call in accordance with said second call forwarding setup result.

10. The method of claim 9 wherein said step of forwarding said call in accordance with said second call forwarding setup result includes the step of terminating an alert given said second station in response to a determination that said second call forwarding setup was successful.

11. The method of claim 9 wherein said step of forwarding said call in accordance with said second call forwarding setup result includes the step of re-establishing said through connection between said first station and said second station in response to a determination that said second call forwarding setup was unsuccessful.

12. The method of claim 9 in which a successful second call forwarding setup result includes an indication that said fourth station is idle.

13. The method of claim 9 in which an unsuccessful second call forwarding setup result includes an indication that said fourth station is busy.

14. The method of claim 9 in which an unsuccessful second call forwarding setup result includes an indication that said fourth station is not reachable because of congested lines.

15. The method of claim 9 wherein said step of forwarding said call in accordance, with said second call forwarding setup result includes the step of establishing a through connection between said first station and said fourth station.

16. The method of claim 15 wherein said step of establishing a through connection between said first station and said fourth station includes the step of alerting said fourth station.

17. An apparatus for call forwarding in a communications system in which a plurality of subscriber stations are interconnected through a switch for communication with one another, said apparatus comprising:

means for receiving in said switch a call from a first station of said plurality of subscriber stations, said call initially addressed to a second station of said plurality of subscriber stations;

means for establishing a through connection between said first station and said second station;

means for alerting said second station;

means for providing a ring tone to said first station;

means for disconnecting said through connection between said first station and said second station;

means for performing a call forwarding setup to a third station of said plurality of subscriber stations;

means for determining a result of said call forwarding setup; and means for forwarding said call in accordance with said call forwarding setup result, wherein said means for forwarding further comprises means for re-establishing said through connection between said first station and said second station in response to a determination that the result of said call forwarding setup was unsuccessful.

18. The apparatus of claim 17 wherein said means for forwarding includes means for terminating an alert given said second station in response to a determination that the result of said call forwarding setup was successful.

19. The apparatus of claim 17 in which a successful call forwarding setup result includes an indication that said third station is idle.

20. The apparatus of claim 17 in which an unsuccessful call forwarding setup result includes an indication that said third station is busy.

21. The apparatus of claim 17 in which an unsuccessful call forwarding setup result includes an indication that said third station is not reachable because of congested lines.

22. The apparatus of claim 17 wherein said means for forwarding includes means for establishing a through connection between said first station and said third station in response to a determination that said call forwarding setup was successful.

23. The apparatus of claim 22 wherein said means for establishing a through connection between said first station and said third station includes means for alerting said third station.

24. The apparatus of claim 17 wherein a subscriber service feature is associated with said third station and said means for forwarding includes means for invoking the subscriber service feature in response to a determination that said call forwarding setup result points out the third station subscriber service feature.

25. The apparatus of claim 24 wherein said means for invoking the subscriber service feature includes:

means for performing a second call forwarding setup to a fourth station;

means for determining a result of said second call forwarding setup; and means for forwarding said call in accordance with said second call forwarding setup result.

26. The apparatus of claim 25 wherein said means for forwarding said call in accordance with said second call forwarding setup result includes means for terminating an alert given said second station in response to a determination that said second call forwarding setup was successful.

27. The apparatus of claim 25 wherein said means for forwarding said call in accordance with said second call forwarding setup result includes means for re-establishing said through connection between said first station and said second station in response to a determination that said second call forwarding setup was unsuccessful.

28. The apparatus of claim 25 in which a successful second call forwarding setup result includes an indication that said fourth station is idle.

29. The apparatus of claim 25 in which an unsuccessful second call forwarding setup result includes an indication that said fourth station is busy.

30. The apparatus of claim 25 in which an unsuccessful second call forwarding setup result includes an indication that said fourth station is not reachable because of congested lines.

31. The apparatus of claim 25 wherein said means for forwarding said call in accordance with said second call forwarding setup result includes means for establishing a through connection between said first station and said fourth station.

32. The apparatus of claim 31 wherein said means for establishing a through connection between said first station and said fourth station includes means for alerting said fourth station.

* * * * *

UNITED STATES PATENT AND TRADEMARK OFFICE
CERTIFICATE OF CORRECTION

PATENT NO. : 5,530,931
DATED : Jun. 25, 1996
INVENTOR(S) : Cook-Hellberg et al.

It is certified that error appears in the above-indentified patent and that said Letters Patent is hereby corrected as shown below:

Column 2, line 44        Replace "subcriber"
                             With --subscriber--

Column 5, line 51        Replace "suplied"
                             With --supplied--

Column 8, line 47        Replace "FeatureCFD"
                             With --FeatureMgr--

Column 10, line 40       Replace "temprarily"
                             With --temporarily--

Signed and Sealed this

Fourth Day of March, 1997

Attest:

BRUCE LEHMAN

Attesting Officer           Commissioner of Patents and Trademarks